United States Patent
Hwang et al.

(10) Patent No.: US 10,928,577 B2
(45) Date of Patent: Feb. 23, 2021

(54) OPTICAL MEMBER AND DISPLAY DEVICE INCLUDING THE SAME

(71) Applicant: Samsung Display Co. Ltd., Yongin-si (KR)

(72) Inventors: Seong Yong Hwang, Hwaseong-si (KR); Jin Ho Park, Suwon-si (KR); Tae Gil Kang, Hwaseong-si (KR); Hyuk Hwan Kim, Hwaseong-si (KR); Sang Won Lee, Seoul (KR); Jae Jin Choi, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/661,266

(22) Filed: Oct. 23, 2019

(65) Prior Publication Data
US 2020/0057185 A1 Feb. 20, 2020

Related U.S. Application Data

(62) Division of application No. 15/803,038, filed on Nov. 3, 2017, now Pat. No. 10,725,224.

(30) Foreign Application Priority Data

Jun. 16, 2017 (KR) .......................... 10-2017-0076521

(51) Int. Cl.
*F21V 8/00* (2006.01)
*G02F 1/13357* (2006.01)
(Continued)

(52) U.S. Cl.
CPC .......... *G02B 6/0026* (2013.01); *G02B 5/0242* (2013.01); *G02B 6/005* (2013.01);
(Continued)

(58) Field of Classification Search
CPC .. G02B 5/0242; G02B 6/0026; G02B 6/0031; G02B 6/0043; G02B 6/005;
(Continued)

(56) References Cited

U.S. PATENT DOCUMENTS

| 5,420,761 A | 5/1995 | Dunah et al. |
| 8,643,465 B2 | 2/2014 | Nagano et al. |

(Continued)

FOREIGN PATENT DOCUMENTS

| JP | 2016181474 | 10/2016 |
| KR | 10-2012-0088273 | 8/2012 |

(Continued)

OTHER PUBLICATIONS

Notice of Allowance dated Mar. 27, 2020, in U.S. Appl. No. 15/803,038.

(Continued)

*Primary Examiner* — Tsion Tumebo
(74) *Attorney, Agent, or Firm* — H.C. Park & Associates, PLC

(57) ABSTRACT

An optical member includes a light guide plate, a first low refractive layer, a wavelength conversion layer, and a passivation layer. The first low refractive layer is disposed on the light guide plate. A refractive index of the first low refractive layer is smaller than a refractive index of the light guide plate. The wavelength conversion layer is disposed on the first low refractive layer. The passivation layer is disposed on the wavelength conversion layer. The passivation layer covers a side surface of the wavelength conversion layer and a side surface of the first low refractive layer on at least one side.

22 Claims, 18 Drawing Sheets

(51) Int. Cl.
*G02B 5/02* (2006.01)
*G02F 1/1335* (2006.01)

(52) U.S. Cl.
CPC ......... *G02B 6/0031* (2013.01); *G02B 6/0043* (2013.01); *G02B 6/0068* (2013.01); *G02B 6/0073* (2013.01); *G02F 1/133504* (2013.01); *G02F 1/133524* (2013.01); *G02F 1/133603* (2013.01); *G02F 1/133609* (2013.01); *G02F 1/133615* (2013.01); *G02B 6/0051* (2013.01); *G02B 6/0053* (2013.01); *G02B 6/0055* (2013.01); *G02F 2001/133614* (2013.01); *G02F 2202/28* (2013.01)

(58) Field of Classification Search
CPC .. G02B 6/0051; G02B 6/0053; G02B 6/0055; G02B 6/0068; G02B 6/0073; G02F 1/133504; G02F 1/133524; G02F 1/133603; G02F 1/133609; G02F 1/133615; G02F 2001/133614; G02F 2202/28
See application file for complete search history.

(56) References Cited

U.S. PATENT DOCUMENTS

| | | | |
|---|---|---|---|
| 8,704,185 | B2 | 4/2014 | Ishida et al. |
| 9,829,607 | B2 | 11/2017 | Lee et al. |
| 2006/0033032 | A1 | 2/2006 | Inoue et al. |
| 2006/0056200 | A1 | 3/2006 | Yamashita et al. |
| 2006/0071233 | A1 | 4/2006 | Cho et al. |
| 2007/0131867 | A1* | 6/2007 | Okada ................ G01T 1/24 250/370.09 |
| 2009/0091258 | A1 | 4/2009 | Heuser et al. |
| 2011/0037926 | A1 | 2/2011 | Tsukahara et al. |
| 2011/0051046 | A1 | 3/2011 | Kim et al. |
| 2011/0187967 | A1 | 8/2011 | Shinohara et al. |
| 2012/0113672 | A1* | 5/2012 | Dubrow ............... G02B 6/0055 362/602 |
| 2014/0049983 | A1* | 2/2014 | Nichol ................. G02B 6/0028 362/610 |
| 2014/0375938 | A1 | 12/2014 | Meyers et al. |
| 2015/0286098 | A1 | 10/2015 | Lee |
| 2015/0300600 | A1 | 10/2015 | Dubrow et al. |
| 2016/0018692 | A1* | 1/2016 | Park .................... G02B 6/0043 349/58 |
| 2016/0209553 | A1 | 7/2016 | Lee et al. |
| 2016/0274284 | A1* | 9/2016 | Ishikawa ............. G02B 5/3016 |
| 2016/0349427 | A1 | 12/2016 | Lin et al. |
| 2018/0039006 | A1 | 2/2018 | Gotou |
| 2019/0025621 | A1 | 1/2019 | Shin et al. |

FOREIGN PATENT DOCUMENTS

| | | |
|---|---|---|
| KR | 10-2013-0120486 | 11/2013 |
| KR | 10-2016-0049082 | 5/2016 |
| WO | 2016/158370 | 10/2016 |

OTHER PUBLICATIONS

Extended European Search Report dated Oct. 17, 2018, in European Patent Application No. 18177432.4.
Non-Final Office Action dated Jul. 29, 2019, in U.S. Appl. No. 15/803,038.
Final Office Action dated Jan. 27, 2020, in U.S. Appl. No. 15/803,058.

* cited by examiner

OPTICAL MEMBER AND DISPLAY DEVICE INCLUDING THE SAME

CROSS-REFERENCE TO RELATED APPLICATION

This application is a Division of U.S. patent application Ser. No. 15/803,038, filed Nov. 3, 2017, which claims priority to and the benefit of Korean Patent Application No. 10-2017-0076521, filed Jun. 16, 2017, each of which is hereby incorporated by reference for all purposes as if fully set forth herein.

BACKGROUND

Field

Exemplary embodiments relate to an optical member and a display device including the same.

Discussion

A liquid crystal display receives light from a backlight assembly and displays an image. Some backlight assemblies include a light source and a light guide plate. The light guide plate receives light from the light source and guides the light toward a display panel. In some products, the light source provides white light, and the white light is filtered by a color filter on the display panel to achieve a color.

Research has been conducted on application of a wavelength conversion to improve image quality, such as color reproducibility of a liquid crystal display. Generally, a blue light source is used as a light source, and a wavelength conversion film is disposed on a light guide plate to convert blue light into white light. The wavelength conversion film may include wavelength conversion particles. Since the wavelength conversion particles are generally vulnerable to moisture, the wavelength conversion film is typically protected with a barrier film also protect the wavelength conversion particles. However, the barrier film is relatively expensive and may increase thickness of a liquid crystal display. Further, since the wavelength conversion film is usually laminated on the light guide plate, a relatively complicated assembly process may be required.

The above information disclosed in this section is only for understanding the background of the inventive concepts, and, therefore, may contain information that does not form prior art.

SUMMARY

Exemplary embodiments are capable of providing an optical member having a light guide function and a sealed wavelength conversion layer.

Exemplary embodiments are capable of providing a display device that includes an optical member having a light guide function and a sealed wavelength conversion layer.

Additional aspects will be set forth in the detailed description which follows, and, in part, will be apparent from the disclosure, or may be learned by practice of the inventive concepts.

According to some exemplary embodiments, an optical member includes a light guide plate, a first low refractive layer, a wavelength conversion layer, and a passivation layer. The first low refractive layer is disposed on the light guide plate. A refractive index of the first low refractive layer is smaller than a refractive index of the light guide plate. The wavelength conversion layer is disposed on the first low refractive layer. The passivation layer is disposed on the wavelength conversion layer. The passivation layer covers a side surface of the wavelength conversion layer and a side surface of the first low refractive layer on at least one side.

According to some exemplary embodiments, an optical member includes a light guide plate, a low refractive layer, a barrier layer, a wavelength conversion layer, and a passivation layer. The low refractive layer is disposed on the light guide plate. A refractive index of the low refractive layer is smaller than a refractive index of the light guide plate. The barrier layer is disposed on the low refractive layer. The wavelength conversion layer is disposed on the barrier layer. The passivation layer is disposed on the wavelength conversion layer. The passivation layer covers a side surface of the wavelength conversion layer on at least one side.

According to some exemplary embodiments, a display device includes an optical member, a light source, and a display panel. The optical member includes a light guide plate, a first low refractive layer, a wavelength conversion layer, and a passivation layer. The first low refractive layer is disposed on the light guide plate. A refractive index of the first low refractive layer is smaller than a refractive index of the light guide plate. The wavelength conversion layer is disposed on the first low refractive layer. The passivation layer is disposed on the wavelength conversion layer. The passivation layer covers a side surface of the wavelength conversion layer and a side surface of the first low refractive layer on at least one side. The light source is disposed on at least one side of the light guide plate. The display panel is disposed on the optical member.

According to some exemplary embodiments, a display device includes an optical member, a light source, and a display panel. The optical member includes a light guide plate, a low refractive layer, a barrier layer, a wavelength conversion layer, and a passivation layer. The low refractive layer is disposed on the light guide plate. A refractive index of the low refractive layer is smaller than a refractive index of the light guide plate. The barrier layer is disposed on the low refractive layer. The wavelength conversion layer is disposed on the barrier layer. The passivation layer is disposed on the wavelength conversion layer. The passivation layer covers a side surface of the wavelength conversion layer on at least one side. The light source is disposed on at least one side of the light guide plate. The display panel is disposed on the optical member.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
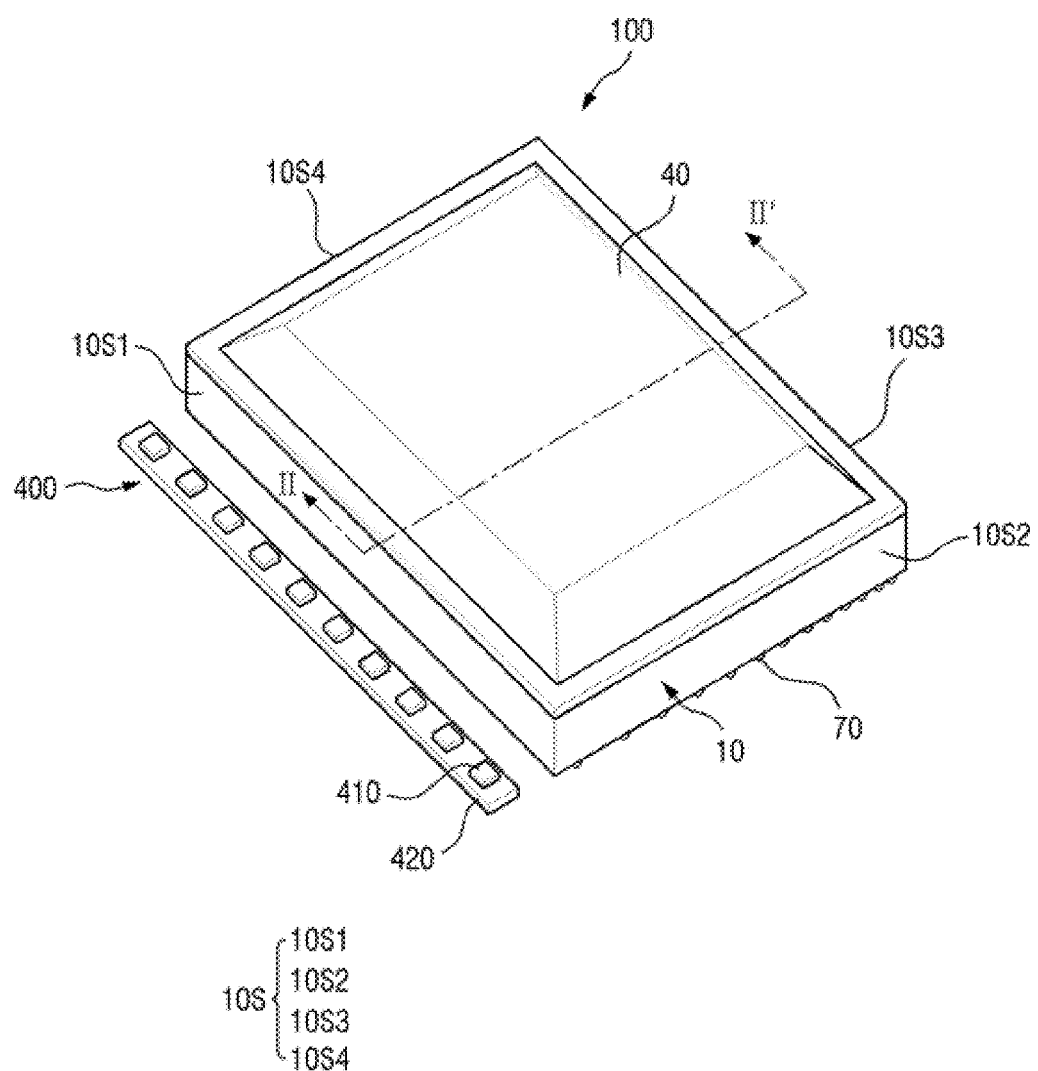
FIG. 1 is a perspective view of an optical member and a light source according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
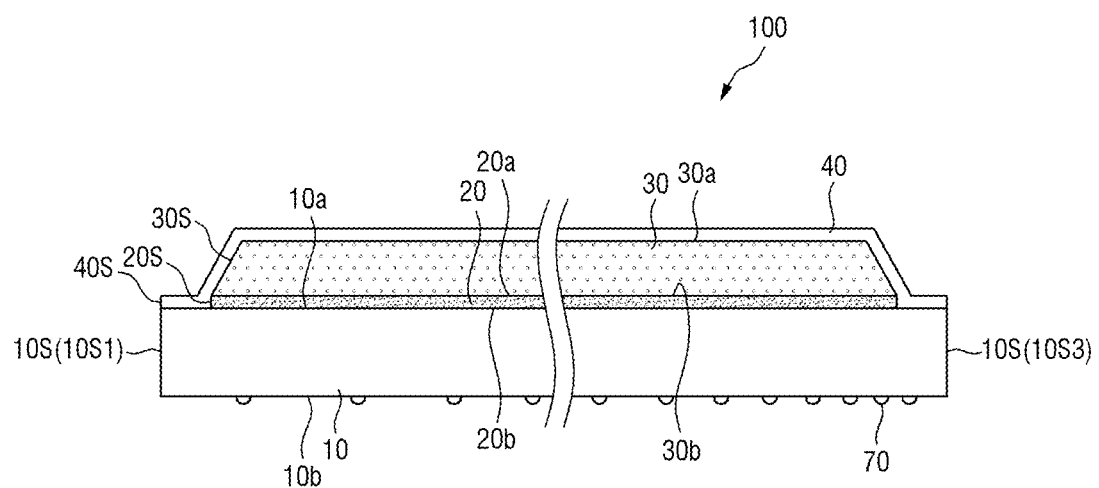
FIG. 2 is a cross-sectional view taken along sectional line II-II' of FIG. 1 according to some exemplary embodiments.

FIG. 1 is a perspective view of an optical member 100 and a light source 400 according to some exemplary embodiments. FIG. 2 is a cross-sectional view taken along sectional line II-II' of FIG. 1 according to some exemplary embodiments.

Referring to FIGS. 1 and 2, the optical member 100 includes a light guide plate 10, a first low refractive layer 20 disposed on the light guide plate 10, a wavelength conversion layer 30 disposed on the first low refractive layer 20, and a passivation layer 40 disposed on the wavelength conversion layer 30. The light guide plate 10, the first low refractive layer 20, the wavelength conversion layer 30, and the passivation layer 40 can be integrated with each other.

The light guide plate 10 serves to guide the path of light. The light guide plate 10 may generally be shaped like a polygonal pillar. The light guide plate 10 may have, but is not limited to, a rectangular planar shape. In some exemplary embodiments, the light guide plate 10 may be shaped like a hexagonal pillar having a rectangular planar shape and may include an upper surface 10a, a lower surface 10b, and four side surfaces 10S (e.g., 10S1, 10S2, 10S3 and 10S4). When a side surface of the light guide plate 10 is to be distinguished from at least one other side surface of the light guide plate 10 in this specification and the accompanying drawings, the four side surfaces will be indicated by "10S1," "10S2," "10S3," and "10S4." However, when a side surface is simply mentioned, it will be indicated by "10S."

In some exemplary embodiments, each of the upper surface 10a and the lower surface 10b of the light guide plate 10 may be located in one plane, and the plane in which the upper surface 10a is located and the plane in which the lower surface 10b is located may be substantially parallel to each other. Therefore, the light guide plate 10 may have a uniform thickness as a whole. However, the upper surface 10a and/or the lower surface 10b can be composed of a plurality of planes, or the plane in which the upper surface 10a is located and the plane in which the lower surface 10b is located can intersect each other. For example, the light guide plate 10, like a wedge-type light guide plate, may become thinner from a side surface (e.g., a light incidence surface) toward the other side surface (e.g., an opposite surface) facing the aforementioned side surface. Alternatively, the lower surface 10b may slope upward from a side surface (e.g., the light incidence surface) to a specific point toward the other side surface (e.g., the opposite surface) facing the side surface such that the light guide plate 10 becomes thinner, and then the upper surface 10a and the lower surface 10b may be flat.

Figure 23:
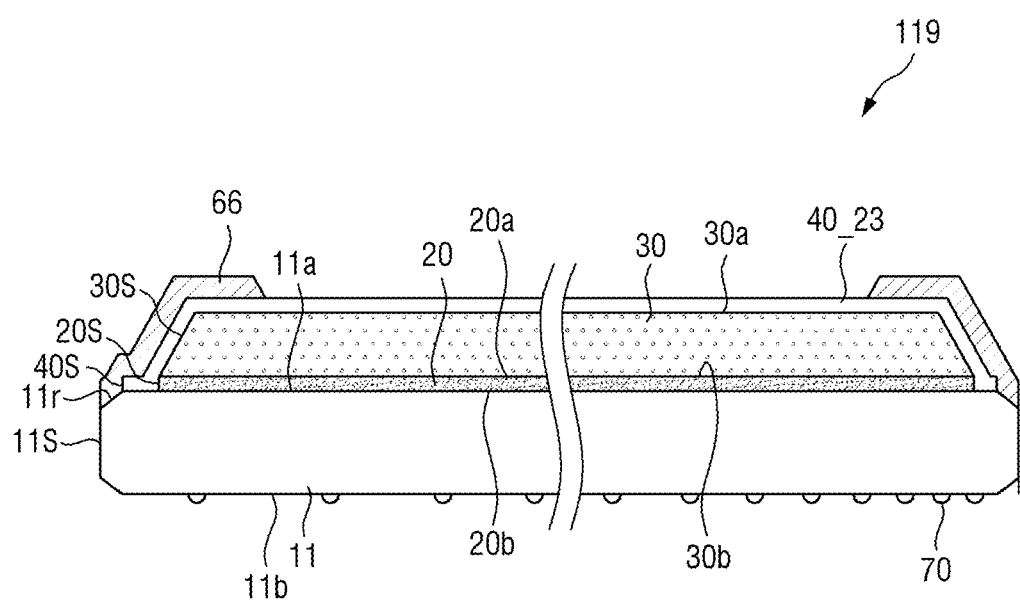
FIG. 23 is a cross-sectional view of an optical member according to some exemplary embodiments.

The plane in which the upper surface 10a and/or the lower surface 10b is located may be at an angle of about 90 degrees to the plane in which each side surface 10S is located. In some exemplary embodiments, as illustrated in FIG. 23, a light guide plate may further include an inclined edge surface 11r between an upper surface 11a and a side surface 11s and/or between a lower surface 11b and the side surface 11s. The edge surface 11r will be described in detail later in association with FIG. 23, and a case where the upper surface 10a and a side surface 10S meet directly without an edge surface to form an angle of 90 degrees will be described below.

In an exemplary embodiment of the optical member 100, the light source 400 may be disposed adjacent to at least one side surface 10S of the light guide plate 10. In the drawings, a plurality of light-emitting diode (LED) light sources 410 mounted on a printed circuit board (PCB) 420 are disposed adjacent to a side surface 10S1 at one long side of the light guide plate 10. However, the inventive concepts are not limited to this case. For example, the LED light sources 410 may be disposed adjacent to side surfaces 10S1 and 10S3 at both long sides, or may be disposed adjacent to a side surface 10S2 or 10S4 at one short side, or the side surfaces 10S2 and 10S4 at both short sides. In this manner, the LED light sources 410 may be disposed at least one of the side surfaces 10S. As seen in FIG. 1, the side surface 10S1 at one long side of the light guide plate 10 to which the light source 400 is adjacently disposed may be a light incidence surface (for ease of description, indicated by "10S1" in the drawings) on which light of the light source 400 is directly incident, and the side surface 10S3 at the other long side which faces the side surface 10S1 may be an opposite side surface (for ease of description, indicated by "10S3" in the drawings).

Scattering patterns 70 may be disposed on the lower surface 10b of the light guide plate 10. The scattering patterns 70 change the angle of light propagating in the light guide plate 10 through total reflection (e.g., total internal reflection) and output the light having the changed angle to the outside of the light guide plate 10.

In some exemplary embodiments, the scattering patterns 70 may be provided as a separate layer or separate patterns. For example, a pattern layer including protruding patterns and/or concave groove patterns may be formed on the lower surface 10b of the light guide plate 10, or printed patterns may be formed on the lower surface 10b of the light guide plate 10 to function as the scattering patterns 70.

In some exemplary embodiments, the scattering patterns 70 may be formed of the surface shape of the light guide plate 10 itself. For example, concave grooves may be formed in the lower surface 10b of the light guide plate 10 to function as the scattering patterns 70.

The arrangement density of the scattering patterns 70 may differ depending on an area of the light guide plate 10. For example, the arrangement density of the scattering patterns 70 may be lower in an area adjacent to the light incidence surface 10S1 to which a relatively large amount of light is provided and may be higher in an area adjacent to the opposite surface 10S3 to which a relatively small amount of light is provided.

The light guide plate 10 may include an inorganic material. For example, the light guide plate 10 may be made of, but is not limited to, glass.

The first low refractive layer 20 is disposed on the upper surface 10a of the light guide plate 10. The first low refractive layer 20 may be formed directly on the upper surface 10a of the light guide plate 10 to contact the upper surface 10a of the light guide plate 10. The first low refractive layer 20 is interposed between the light guide plate 10 and the wavelength conversion layer 30 to help total reflection of the light guide plate 10.

For example, to efficiently guide light from the light incidence surface 10S1 to the opposite surface 10S3, effective total internal reflection should occur on the upper surface 10a and the lower surface 10b of the light guide plate 10. One of the conditions under which total internal reflection can occur in the light guide plate 10 is that a refractive index of the light guide plate 10 is greater than a refractive index of a medium that forms an optical interface with the light guide plate 10. As the refractive index of the medium that forms the optical interface with the light guide plate 10 is lower, a total reflection critical angle becomes smaller, leading to more total internal reflections.

In a case where the light guide plate 10 is made of glass having a refractive index of about 1.5, sufficient total reflection can occur because the lower surface 10b of the light guide plate 10 is exposed to an air layer having a refractive index of about 1, and forms an optical interface with the air layer.

On the other hand, since other optical functional layers may be integrally laminated on the upper surface 10a of the light guide plate 10, it is more difficult to achieve sufficient total reflection on the upper surface 10a as compared with the lower surface 10b. For example, if a material layer having a refractive index of 1.5 or more is laminated on the upper surface 10a of the light guide plate 10, total reflection cannot occur on the upper surface 10a of the light guide plate 10. In addition, if a material layer having a refractive index of, for instance, about 1.49 slightly smaller than that of the light guide plate 10 is laminated on the upper surface 10a of the light guide plate 10, total internal reflection can occur on the upper surface 10a of the light guide plate 10, but sufficient total reflection cannot occur due to a too large of a critical angle. The wavelength conversion layer 30 laminated on the upper surface 10a of the light guide plate 10 typically has a refractive index of about 1.5. If this wavelength conversion layer 30 is directly laminated on the upper surface 10a of the light guide plate 10, it is relatively difficult to have sufficient total reflection on the upper surface 10a of the substrate 10.

The first low refractive layer 20 interposed between the light guide plate 10 and the wavelength conversion layer 30 and forming an interface with the upper surface 10a of the light guide plate 10 has a refractive index lower than that of the light guide plate 10, so that total reflection can occur on the upper surface 10a of the light guide plate 10. In addition, the first low refractive layer 20 has a refractive index lower than that of the wavelength conversion layer 30, which is a material layer disposed on the first low refractive layer 20, so that more total reflection can occur than when the wavelength conversion layer 30 is disposed directly on the upper surface 10a of the light guide plate 10.

The difference between the refractive index of the light guide plate 10 and the refractive index of the first low refractive layer 20 may be 0.2 or more. When the refractive index of the first low refractive layer 20 is smaller than the refractive index of the light guide plate 10 by 0.2 or more, sufficient total reflection can be achieved at the upper surface 10a of the light guide plate 10. There is no upper limit on the difference between the refractive index of the light guide plate 10 and the refractive index of the first low refractive layer 20. However, considering typical materials of the light guide plate 10 and typical refractive indexes of the first low refractive layer 20, the difference between the refractive index of the light guide plate 10 and the refractive index of the first low refractive layer 20 may be 1 or less.

The refractive index of the first low refractive layer 20 may be in the range of 1.2 to 1.4. Generally, as the refractive index of a solid medium becomes closer to 1, manufacturing cost exponentially increases. When the refractive index of the first low refractive layer 20 is 1.2 or more, an excessive increase in the manufacturing cost can be prevented or at least reduced. In addition, the first low refractive layer 20 having a refractive index of 1.4 or less is advantageous in sufficiently reducing the total reflection critical angle of the upper surface 10a of the light guide plate 10. In some exemplary embodiments, the first low refractive layer 20 having a refractive index of about 1.25 may be applied.

Figure 3:
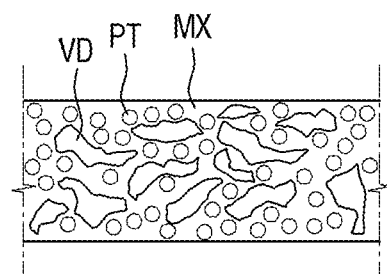
FIGS. 3 and 4 are cross-sectional views of low refractive layers according to various exemplary embodiments.
Figure 4:
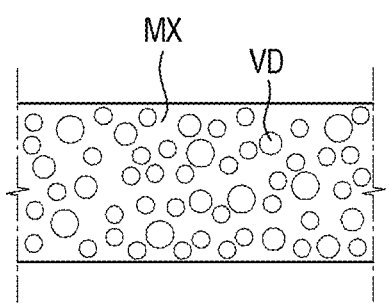

To have the above-mentioned low refractive index, the first low refractive layer 20 may include voids. The voids may be held in vacuum or may be filled with an air layer, gas, or the like. In other words, the voids may have a negative, zero, or positive pressure. The spaces of the voids may be defined by particles or a matrix. FIGS. 3 and 4 will be referred to for a more detailed description.

FIGS. 3 and 4 are cross-sectional views of low refractive layers according to various exemplary embodiments.

In some exemplary embodiments, a first low refractive layer 20 may include a plurality of particles PT, a matrix MX surrounding the particles PT and formed as a single piece, and a plurality of voids VD, as illustrated in FIG. 3. The particles PT may be a filler that adjusts the refractive index and mechanical strength of the first low refractive layer 20.

The particles PT may be dispersed within the matrix MX of the first low refractive layer 20, and the voids VD may be formed in open portions of the matrix MX. For example, after the particles PT and the matrix MX are mixed in a solvent, if the mixture is dried and/or cured, the solvent may evaporate. At this time, the void VD may be formed between portions of the matrix MX.

In some exemplary embodiments, a first low refractive layer 20 may include a matrix MX and voids VD without particles, as illustrated in FIG. 4. For example, the first low refractive layer 20 may include the matrix MX formed as a single piece like foam resin and a plurality of voids VD disposed in the matrix MX.

When the first refractive layer 20 includes the voids VD as illustrated in FIGS. 3 and 4, a total refractive index of the first low refractive layer 20 may have a value between a refractive index of the particles PT/the matrix MX and a refractive index of the voids VD. When the voids VD are held in vacuum having a refractive index of 1 or an air layer or gas having a refractive index of about 1, even if a material having a refractive index of 1.4 or more is used as the particles PT/the matrix MX, the total refractive index of the first low refractive layer 20 may have a value of 1.4 or less, for example, about 1.25. In some exemplary embodiments, the particles PT may be made of an inorganic material, such as at least one of $SiO_2$, $Fe_2O_3$, and $MgF_2$, and the matrix MX may be made of an organic material, such as polysiloxane. However, other organic materials and/or inorganic materials can be used.

Referring again to FIGS. 1 and 2, the first low refractive layer 20 may have a thickness of 0.4 µm to 2 µm. When the thickness of the first low refractive layer 20 is 0.4 µm or more, which is associated with a visible light wavelength range, the first low refractive layer 20 can form effective optical interface with the upper surface 10a of the light guide plate 10. As such, total reflection according to Snell's law can be achieved well at the upper surface 10a of the light guide plate 10. When the first low refractive layer 20 is too thick, it may go against the thinning of the optical member 100, increase the material cost, and undermine the luminance of the optical member 100. Therefore, the first low refractive layer 20 may be formed to a thickness of 2 µm or less. In some exemplary embodiments, the thickness of the first low refractive layer 20 may be about 0.5 µm.

The first low refractive layer 20 may cover most of the upper surface 10a of the light guide plate 10, but expose part of edges of the light guide plate 10. In other words, the side surfaces 10S of the light guide plate 10 may protrude from side surfaces 20S of the first low refractive layer 20. A portion of the upper surface 10a, which is exposed by the first low refractive layer 20, provides a space where the side surfaces 20S of the first low refractive layer 20 can be stably covered by the passivation layer 40.

The first low refractive layer 20 may be formed by a method, such as coating. For example, the first low refractive layer 20 may be formed by coating a composition for forming a first low refractive layer on the upper surface 10a of the light guide plate 10, and drying and curing the composition. Examples of the method of coating the composition for forming a first low refractive layer include slit coating, spin coating, roll coating, spray coating, and ink jet. However, the coating method is not limited to the above examples, and various other methods (e.g., lamination methods) can be applied.

The wavelength conversion layer 30 is disposed on an upper surface 20a of the first low refractive layer 20. The wavelength conversion layer 30 converts the wavelength of at least a portion of incident light. The wavelength conversion layer 30 may include a binder layer and wavelength conversion particles dispersed in the binder layer. The wavelength conversion layer 30 may further include scattering particles dispersed in the binder layer in addition to the wavelength conversion particles.

The binder layer is a medium in which the wavelength conversion particles are dispersed and may be made of various resin compositions that can be generally referred to as binders. However, the inventive concepts are not limited to this case, and any medium in which the wavelength conversion particles and/or the scattering particles can be dispersed can be referred to as the binder layer regardless of its name, additional functions, constituent materials, and the like.

The wavelength conversion particles are particles that convert the wavelength of incident light. For example, the wavelength conversion particles may be at least one of quantum dots, a fluorescent material, and a phosphorescent material. For example, the quantum dots, which are an example of the wavelength conversion particles, are a material having a crystal structure of several nanometers in size. The quantum dots may be composed of several hundreds to thousands of atoms and exhibit a quantum confinement effect in which an energy band gap increases due to the small size of the quantum dots. When light of a wavelength having a higher energy than a band gap is incident on the quantum dots, the quantum dots are excited by absorbing the light and fall to a lower state (e.g., ground state) while emitting light of a specific wavelength. The emitted light of the specific wavelength has a value corresponding to the band gap. Emission characteristics of the quantum dots due to the quantum confinement effect can be adjusted by controlling the size and composition of the quantum dots.

The quantum dots may include at least one of a group II-VI compound, a group II-V compound, a group III-VI compound, a group III-V compound, a group IV-VI compound, a group I-III-VI compound, a group II-IV-VI compound, and a group II-IV-V compound.

A quantum dot may include a core and a shell overcoating the core. The core may be, but is not limited to, at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, Fe2O3, Fe3O4, Si, and Ge. The shell may include, but is not limited to, at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, and PbTe.

The wavelength conversion particles may include a plurality of wavelength conversion particles that convert incident light into different wavelengths. For example, the wavelength conversion particles may include first wavelength conversion particles that convert incident light of a specific wavelength into light of a first wavelength and emit the light of the first wavelength, and second wavelength conversion particles that convert incident light of a specific wavelength into light of a second wavelength and emit the light of the second wavelength. In some exemplary embodiments, light emitted from the light source 400 and then incident on the wavelength conversion particles may be light of a blue wavelength, the first wavelength may be a green wavelength, and the second wavelength may be a red wavelength. For example, the blue wavelength may be a wavelength having a peak at 420 to 470 nm, the green wavelength may be a wavelength having a peak at 520 to 570 nm, and the red wavelength may be a wavelength having a peak at 620 to 670 nm. However, the blue, green, and red wavelengths are not limited to the aforementioned examples, and include all wavelength ranges recognized in the art as at least one of blue, green, and red.

According to some exemplary embodiments, when blue light incident on the wavelength conversion layer 30 passes through the wavelength conversion layer 30, a portion of the blue light may be incident on the first wavelength conversion particles to be converted into the green wavelength and emitted accordingly, another portion of the blue light may be incident on the second wavelength conversion particles to be converted into the red wavelength and emitted accordingly, and a remaining portion of the blue light may be emitted as it is without entering the first or second wavelength conversion particles. Therefore, light that passed through the wavelength conversion layer 30 includes all light of the blue wavelength, light of the green wavelength, and light of the red wavelength. If a ratio of emitted light of different wavelengths is appropriately adjusted, white light or outgoing light of other colors can be displayed. Light converted by the wavelength conversion layer 30 is concentrated in a narrow range of specific wavelengths and has a sharp spectrum with a narrow half width. Therefore, when the light of such a spectrum is filtered using a color filter to realize a color, color reproducibility can be improved.

Unlike as previously described, incident light can be light having a short wavelength, such as ultraviolet light, and three types of wavelength conversion particles for converting the incident light into the blue, green, and red wavelengths can be disposed in the wavelength conversion layer 30 to emit, for example, white light.

The wavelength conversion layer 30 may further include scattering particles. The scattering particles may be non-quantum dot particles and have no wavelength conversion function. The scattering particles may scatter incident light to cause more incident light to enter the wavelength conversion particles. In addition, the scattering particles may uniformly control an output angle of light for each wavelength. For example, when a portion of incident light that enters the wavelength conversion particles is emitted after its wavelength is converted by the wavelength conversion particles, the emission direction of the portion of the incident light has random scattering characteristics. If there are no scattering particles in the wavelength conversion layer 30, the green and red wavelengths emitted after colliding with the wavelength conversion particles may have scattering emission characteristics, but the blue wavelength emitted without colliding with the wavelength conversion particles may not have the scattering emission characteristics. Therefore, the emission amount of the blue/green/red wavelength will vary according to output angle. The scattering particles may give the scattering emission characteristics even to the blue wavelength emitted without colliding with the wavelength conversion particles, thereby controlling the output angle of light for each wavelength to be similar. The scattering particles may be, for instance, at least one of $TiO_2$ and $SiO_2$.

The wavelength conversion layer 30 may be thicker than the first low refractive layer 20. The thickness of the wavelength conversion layer 30 may be about 10 to 50 μm, e.g., 20 μm to 40 μm, such as 10 μm to 30 μm, for example, 20 μm to 50 μm. In some exemplary embodiments, the thickness of the wavelength conversion layer 30 may be about 15 μm.

The wavelength conversion layer 30 may cover the upper surface 20a of the first low refractive layer 20 and may completely overlap the first low refractive layer 20. However, the inventive concepts are not limited thereto. A lower surface 30b of the wavelength conversion layer 30 may directly contact the upper surface 20a of the first low refractive layer 20. In some exemplary embodiments, side surfaces 30S of the wavelength conversion layer 30 may be aligned with side surfaces 20S of the first low refractive layer 20. An inclination angle of each side surface 30S of the wavelength conversion layer 30 may be smaller than an inclination angle of each side surface 20S of the first low refractive layer 20. When the wavelength conversion layer 30 is formed by a method, such as slit coating as will be described later, the side surfaces 30S of the relatively thick wavelength conversion layer 30 may have a gentler inclination angle than e side surfaces 20S of the first low refractive layer 20. However, the inventive concepts are not limited to this case. Depending on the formation method, the inclination angle of each side surface 30S of the wavelength conversion layer 30 may be substantially equal to or smaller than the inclination angle of each side surface 20S of the first low refractive layer 20.

The wavelength conversion layer 30 may be formed by a method, such as coating. For example, the wavelength conversion layer 30 may be formed by slit-coating a wavelength conversion composition on the light guide plate 10 having the first low refractive layer 20, and drying and curing the wavelength conversion composition. However, the method of forming the wavelength conversion layer 30 is not limited to the above example, and various other methods (e.g., coating methods, lamination methods, etc.) can be applied.

The passivation layer 40 is disposed on the first low refractive layer 20 and the wavelength conversion layer 30. The passivation layer 40 serves to prevent (or at least reduce) the penetration of moisture and/or oxygen (hereinafter, referred to as "moisture/oxygen"). The passivation layer 40 may include an inorganic material, such as at least one of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, and a metal thin film having a secured light transmittance. In some exemplary embodiments, the passivation layer 40 may be made of silicon nitride.

The passivation layer 40 may completely cover the first low refractive layer 20 and the wavelength conversion layer 30 on at least one side. In some exemplary embodiments, the passivation layer 40 may completely cover the first low refractive layer 20 and the wavelength conversion layer 30 on all sides, or all sides not covered by the light guide plate 10.

The passivation layer 40 completely overlaps the wavelength conversion layer 30, covers an upper surface 30a of the wavelength conversion layer 30, and extends further outward to cover the side surfaces 30S of the wavelength conversion layer 30 and the side surfaces 20S of the first low refractive layer 20. The passivation layer 40 may contact the upper surface 30a and the side surfaces 30S of the wavelength conversion layer 30 and the side surfaces 20S of the first low refractive layer 20. The passivation layer 40 may extend up to the upper surface 10a at the edges of the light guide plate 10 exposed by the first low refractive layer 20 such that part of edge portions of the passivation layer 40 can directly contact the upper surface 10a of the light guide plate 10. In some exemplary embodiments, side surfaces 40S of the passivation layer 40 may be aligned with the side surfaces 10S of the light guide plate 10. An inclination angle of each side surface 40S of the passivation layer 40 may be larger than the inclination angle of each side surface 30S of the wavelength conversion layer 30. Further, the inclination angle of each side surface 40S of the passivation layer 40 may be larger than the inclination angle of each side surface 20S of the first low refractive layer 20.

A thickness of the passivation layer 40 may be smaller than that of the wavelength conversion layer 30 and may be similar to or smaller than that of the first low refractive layer 20. The thickness of the passivation layer 40 may be 0.1 μm to 2 μm. If the thickness of the passivation layer 40 is 0.1 μm or more, the passivation layer 40 can have a significant moisture/oxygen penetration preventing (or at east reducing) function. If the thickness is 0.3 μm or more, the passivation layer 40 can have an effective moisture/oxygen penetration preventing function. The passivation layer 40 having a thickness of 2 μm or less is advantageous in terms of thinning and transmittance. In some exemplary embodiments, the thickness of the passivation layer 40 may be about 0.4 μm.

The wavelength conversion layer 30, particularly the wavelength conversion particles included in the wavelength conversion layer 30, is vulnerable to moisture/oxygen. In the case of a wavelength conversion film, a barrier film is typically laminated on upper and lower surfaces of a wavelength conversion layer to prevent the penetration of water/ oxygen into the wavelength conversion layer. According to various exemplary embodiments, however, the wavelength conversion layer 30 is directly disposed without a barrier film. Therefore, a sealing structure for protecting the wavelength conversion layer 30 instead of the barrier film is utilized. The sealing structure may be realized by the passivation layer 40 and the light guide plate 10.

A gate through which moisture can penetrate into the wavelength conversion layer 30 is the upper surface 30a, the side surfaces 30S, and the lower surface 30b of the wavelength conversion layer 30. As described above, since the upper surface 30a and the side surfaces 30S of the wavelength conversion layer 30 are covered and protected by the passivation layer 40, the penetration of moisture/oxygen penetration can be blocked or at least reduced (hereinafter, referred to as "blocked/reduced").

The lower surface 30b of the wavelength conversion layer 30 is in contact with the upper surface 20a of the first low refractive layer 20. If the first low refractive layer 20 includes the voids VD or is made of an organic material, the movement of moisture in the first low refractive layer 20 is possible. Therefore, moisture/oxygen can be introduced to the lower surface 30b of the wavelength conversion layer 30 through the first low refractive layer 20. However, since the first low refractive layer 20 also has a sealing structure, according to various exemplary embodiments, the penetration of moisture/oxygen through the lower surface 30b of the wavelength conversion layer 30 can be blocked/reduced.

For example, since the side surfaces 20S of the first low refractive layer 20 are covered and protected by the passivation layer 40, the penetration of moisture/oxygen through the side surfaces 20S of the first low refractive layer 20 can be blocked/reduced. Even if the first low refractive layer 20 protrudes further than the wavelength conversion layer 30 so that a portion of the upper surface 20a is exposed, since the protruding portion is covered and protected by the passivation layer 40, the penetration of moisture/oxygen through the protruding portion can be blocked/reduced. A lower surface 20b of the first low refractive layer 20 is in contact with the light guide plate 10. When the light guide plate 10 is made of an inorganic material such as glass, it can block/reduce the penetration of moisture/oxygen, like the passivation layer 40. That is, since the surfaces of a laminate of the first low refractive layer 20 and the wavelength conversion layer 30 are surrounded and sealed by the passivation layer 40 and the light guide plate 10, even if a moisture/oxygen movement path is formed inside the first refractive layer 20, the penetration of moisture/oxygen can be blocked/reduced by the above sealing structure. Therefore, deterioration of the wavelength conversion particles due to moisture/oxygen can be prevented or at least mitigated.

The passivation layer 40 may be formed by a method, such as vapor deposition. For example, the passivation layer 40 may be formed on the light guide plate 10, on which the first low refractive layer 20 and the wavelength conversion layer 30 are sequentially formed, by chemical vapor deposition. However, the method of forming the passivation layer 40 is not limited to the above example, and various other methods can be applied.

As described above, the optical member 100, which is an integrated single member, can simultaneously perform a light guide function and a wavelength conversion function. The integrated single member can simplify the process of assembling a display device. In addition, the optical member 100 allows total reflection to be performed effectively on the upper surface 10a of the light guide plate 10 because the first low refractive layer 20 is disposed on the upper surface 10a of the light guide plate 10. Also, since the first low refractive layer 20 and the wavelength conversion layer 30 are sealed with the passivation layer 40, deterioration of the wavelength conversion layer 30 can be prevented or least mitigated.

Furthermore, the wavelength conversion layer 30 and the sealing structure of the optical member 100 can reduce the manufacturing cost and thickness as compared with a wavelength conversion film provided as a separate film. For example, the wavelength conversion film includes a barrier film attached to the upper and lower surfaces of the wavelength conversion layer. Here, the barrier film is not only expensive, but also has a large thickness of 100 μm or more. Therefore, the total thickness of the wavelength conversion film is about 270 μm. On the other hand, in the case of the optical member 100 according to various exemplary embodiments, the first low refractive layer 20 can be formed to a thickness of about 0.5 μm, and the passivation layer 40 can be formed to a thickness of about 0.4 μm. Therefore, the total thickness excluding the thickness of the light guide plate 10 can be maintained at about 16 μm. Accordingly, the thickness of a display device employing the optical member 100 can be reduced. Also, since the optical member 100 can omit the expensive barrier film, the manufacturing cost can be controlled to a level lower than that of a conventional wavelength conversion film structure.

Hereinafter, optical members according to various other and/or additional embodiments will be described. In the following embodiments, a description of components identical to those of the above-described embodiments will be omitted or given briefly, and differences from the above-described embodiments will be mainly described. To this end, similarly referenced components may be similarly configured apart from differences described herein. Although some of the following drawings show the arrangement/alignment relationship on one side of an optical member, the same structure can be applied to a plurality of sides or all sides, and various side structures can be applied in combination. Each structure can be obtained intentionally, but can also be unintentionally obtained in the manufacturing process.

FIGS. 5 through 8 are cross-sectional views of optical members 101 through 104 according to various exemplary embodiments. The exemplary embodiments of FIGS. 5 through 8 demonstrate that the arrangement and alignment relationship of components of an optical member can be variously modified.

Figure 5:
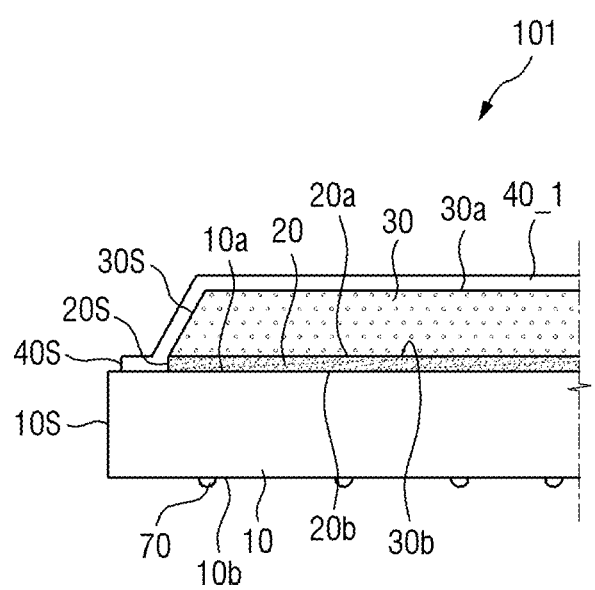
FIGS. 5, 6, 7, and 8 are cross-sectional views of optical members according to various exemplary embodiments.

In FIG. 5, a case where a passivation layer 40_1 of the optical member 101 covers not the entire upper surface 10a of a light guide plate 10 exposed by a first low refractive layer 20 is illustrated. That is, unlike in FIG. 2, a side surface 40S of the passivation layer 40 may not be aligned with a side surface 10S of the light guide plate 10, but may be located inside the side surface 10S of the light guide plate 10. Such a structure can be formed when a deposition process for forming the passivation layer 40_1 is performed with a certain margin from the side surface 10S of the light guide plate 10 in order to prevent a passivation material from being deposited on the side surface 10S of the light guide plate 10. Even in this case, a sealing structure can be maintained as long as the passivation layer 40_1 covers both a wavelength conversion layer 30 and the first low refractive layer 20.

Figure 6:
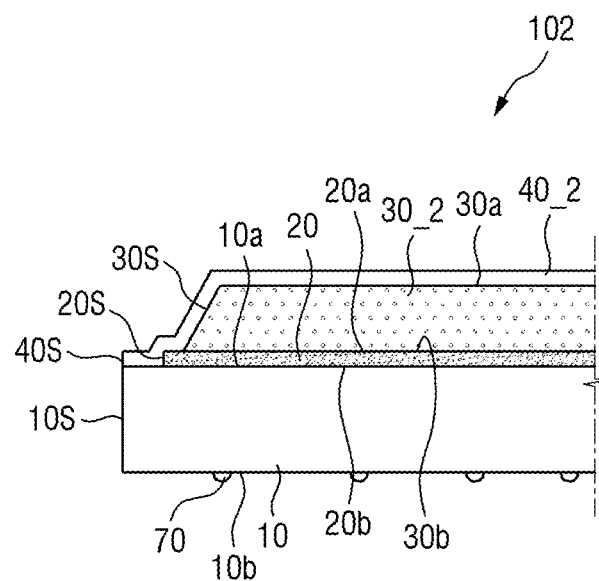
Figure 7:
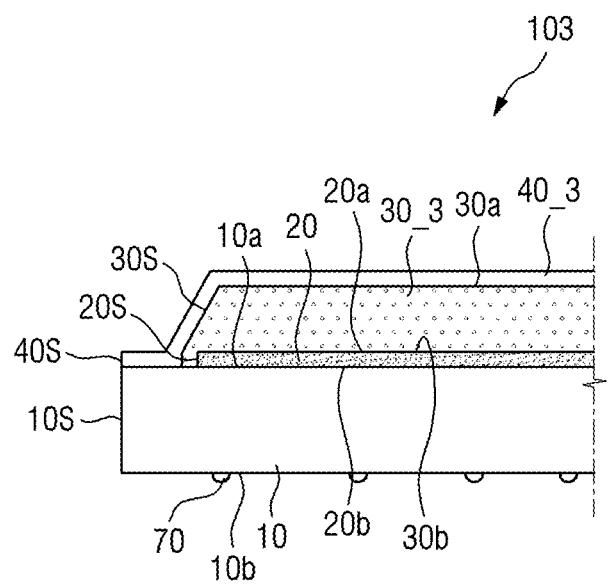

In FIGS. 6 and 7, a case where a side surface 20S of a first low refractive layer 20 of the optical member 102 or 103 is not aligned with a side surface 30S of a wavelength conversion layer 30_2 or 30_3 is illustrated.

For example, referring to FIG. 6, the side surface 30S of the wavelength conversion layer 30_2 of the optical member 102 may be disposed inside the side surface 20S of the first low refractive layer 20. That is, the side surface 20S of the first low refractive layer 20 may protrude further outward than the side surface 30S of the wavelength conversion layer 30_2. Such a structure can be obtained when the wavelength conversion layer 30_2 is formed with a certain margin from the side surface 20S of the first low refractive layer 20 such that the wavelength conversion layer 30_2 can be stably disposed on the first low refractive layer 20 for improving total reflection efficiency. Even in this case, a sealing structure can be maintained because a passivation layer 40_2 covers both the wavelength conversion layer 30 and the first low refractive layer 20. It is noted, however, that the passivation layer 40_2 includes an additional step in an outer side portion due to the protrusion of the side surface 20S of the first low refractive layer 20 beyond the side surface 30S of the wavelength conversion layer 30_2.

In another example, referring to FIG. 7, the side surface 30S of the wavelength conversion layer 30_3 of the optical member 103 may protrude further outward than the side surface 20S of the first low refractive layer 20. The wavelength conversion layer 30_3 protruding outward may cover the side surface 20S of the first low refractive layer 20 versus a passivation layer 40_3, and a portion of the wavelength conversion layer 30_3 may directly contact an upper surface 10a of a light guide plate 10. Even in this case, since the passivation layer 40_3 covers the side surface 30S of the wavelength conversion layer 30_3 and a protruding portion of a lower surface 30b of the wavelength conversion layer 30_3 is protected by the light guide plate 10, a sealing structure can be maintained. According to the structure illustrated in FIG. 7, total reflection may not occur well at an edge portion of the optical member 103 where the wavelength conversion layer 30_3 directly contacts the upper surface 10a of the light guide plate 10. However, this exemplary embodiment can be useful when the luminance of the edge portion is to be particularly high or when a light transmission blocking pattern (see, e.g., components 60 through 66 in FIGS. 17 through 23) or a light shielding member is applied to the edge portion of an optical member.

Figure 8:
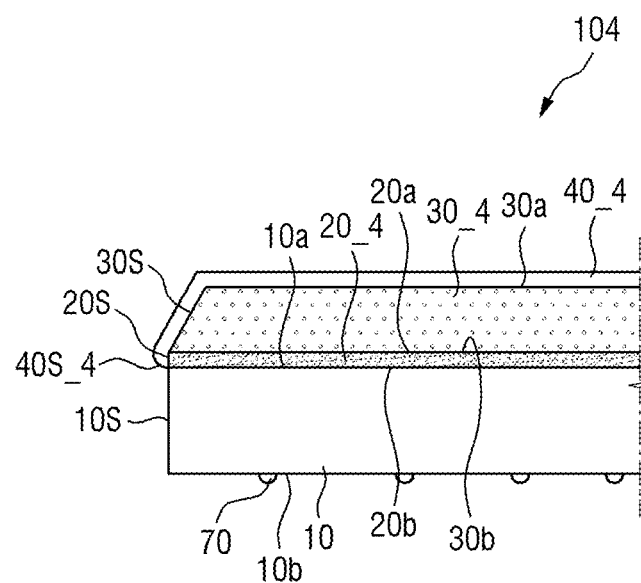

In FIG. 8, a case where a side surface 40S_4 of a passivation layer 40_4 of the optical member 104 protrudes further outward than a side surface 10S of a light guide plate 10 is illustrated. For example, referring to FIG. 8, a side surface 20S of a first low refractive layer 20_4 may be aligned with the side surface 10S of the light guide plate 10, and the passivation layer 40_4 may extend further outward than the side surface 20S of the first low refractive layer 20_4 to cover the side surface 20S of the first low refractive layer 20_4. In some exemplary embodiments, the passivation layer 40_4 may cover up to part of the side surface 10S of the light guide plate 10. Even in this case, a sealing structure can be maintained as long as the passivation layer 40_4 covers both a wavelength conversion layer 30_4 and the first low refractive layer 20_4. The structure illustrated in FIG. 8 may be advantageous in maximizing the effective light guide area of the light guide plate 10. Although not illustrated, the passivation layer 40_4 can protrude further outward than the side surface 10S of the light guide plate 10 even when the first low refractive layer 20_4 is located further inwards than the side surface 10S of the light guide plate 10, as illustrated in FIG. 2.

Figure 9:
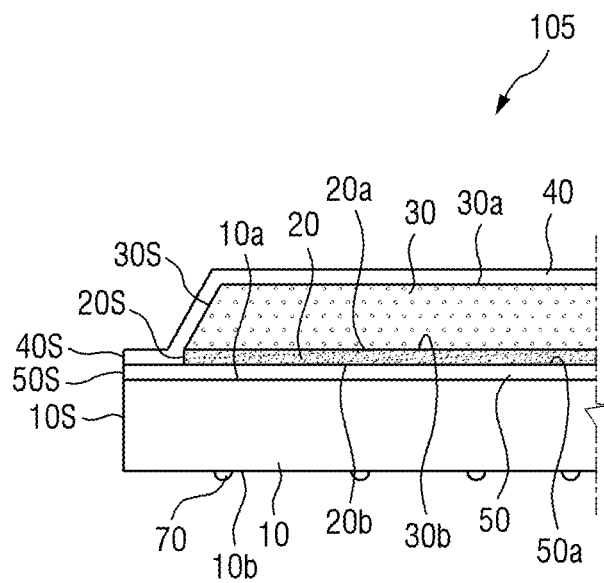
FIG. 9 is a cross-sectional view of an optical member according to some exemplary embodiments.

FIG. 9 is a cross-sectional view of an optical member 105 according to an embodiment.

The optical member 105 is different from the structure illustrated in FIG. 2 in that the optical member 105 further includes a barrier layer 50 disposed on an upper surface 10a of a light guide plate 10. From the perspective of the arrangement of components, the upper surface 10a of the light guide plate 10 of FIG. 2 may be replaced with an upper surface 50a of the barrier layer 50 in FIG. 9. For example, the barrier layer 50 is disposed on the upper surface 10a of the light guide plate 10, and a first low refractive layer 20, a wavelength conversion layer 30, and a passivation layer 40 are sequentially laminated on the barrier layer 50. The barrier layer 50 may cover the entire upper surface 10a of the light guide plate 10. A side surface 50S of the barrier layer 50 may be aligned with a side surface 10S of the light guide plate 10.

The first low refractive layer 20 is in contact with the upper surface 50a of the barrier layer 50. The first low refractive layer 20 may partially expose an edge portion of the barrier layer 50. The wavelength conversion layer 30 is disposed on the first low refractive layer 20, and the passivation layer 40 completely covers the first low refractive layer 20 and the wavelength conversion layer 30. The passivation layer 40 completely overlaps the wavelength conversion layer 30 and extends further outward from the wavelength conversion layer 30 to cover a side surface 30S of the wavelength conversion layer 30 and a side surface 20S of the first low refractive layer 20. The passivation layer 40 extends to the upper surface 50a of the edge portion of the barrier layer 50 exposed by the first low refractive layer 20. Therefore, part of an edge portion of the passivation layer 40 may contact the upper surface 50a of the barrier layer 50.

Like the passivation layer 40, the barrier layer 50 serves to prevent (or at least reduce) the penetration of moisture/oxygen. The barrier layer 50 may include an inorganic material. For example, the barrier layer 50 may be made of at least one of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, and a metal thin film having secured light transmittance. The barrier layer 50 may be made of, but is not limited to, the same material as the passivation layer 40. The barrier layer 50 may be formed by a deposition method, such as chemical vapor deposition.

A thickness of the barrier layer 50 may be similar to that of the passivation layer 40. For example, the barrier layer 50 may have a thickness of 0.1 μm to 2 μm.

A refractive index of the barrier layer 50 may be substantially the same as a refractive index of the light guide plate 10 in order for smooth light guide function of the optical member 105. However, the refractive index of the barrier layer 50 may also be different from the refractive index of the light guide plate 10.

For example, if the refractive index of the barrier layer 50 is equal to the refractive index of the light guide plate 10, a boundary between the light guide plate 10 and the barrier layer 50 is not recognized as an interface with respect to the propagation of incident light. Therefore, the direction of light entering the boundary is not changed. Accordingly, the light guide plate 10 and the barrier layer 50 together can perform substantially the same light guide function as the light guide plate 10 of FIG. 2.

If the refractive index of the barrier layer 50 is greater than the refractive index of the light guide plate 10, an output angle becomes smaller at the interface. However, since the difference in refractive index between the barrier layer 50 and the first low refractive layer 20 becomes larger, effective total reflection can occur at an interface between the barrier layer 50 and the first low refractive layer 20.

If the refractive index of the barrier layer 50 is smaller than the refractive index of the light guide plate 10, the output angle becomes larger, and some light is totally reflected at the interface. Therefore, the overall total reflection efficiency can be maintained.

In another way of maintaining light guide characteristics similar to those described in association with FIG. 2, the thickness of the barrier layer 50 may be formed to be smaller than a length of a visible light wavelength. For example, when the thickness of the barrier layer 50 is set to 0.4 μm or less, for example, set in the range of 0.1 μm to 0.4 μm, an effective optical interface may not be formed between the light guide plate 10 and the barrier layer 50 and between the barrier layer 50 and the first low refractive layer 20. Therefore, the same light guide characteristics as those described in association with FIG. 2 can be exhibited irrespective of the refractive index of the barrier layer 50. Considering the moisture/oxygen penetration preventing performance as well, the thickness of the barrier layer 50 may be in the range of 0.3 μm to 0.4 μm.

As described above, according to the structure of FIG. 9, the sealing structure of the wavelength conversion layer 30 can be realized by the passivation layer 40 and the barrier layer 50. Therefore, even if the water/oxygen penetration preventing function of the light guide plate 10 is not sufficient, the penetration of moisture/oxygen can be effectively prevented by the barrier layer 50. From this point of view, the degree of freedom in selecting the constituent material(s) of the light guide plate 10 can be increased. For example, even if the light guide plate 10 is made of polymer resin, such as polymethyl methacrylate (PMMA) or polycarbonate (PC), or acrylic resin instead of an inorganic material, such as glass, the penetration of moisture/oxygen can be prevented by the barrier layer 50, which, in turn, prevents deterioration of the wavelength conversion layer 30.

Figure 10:
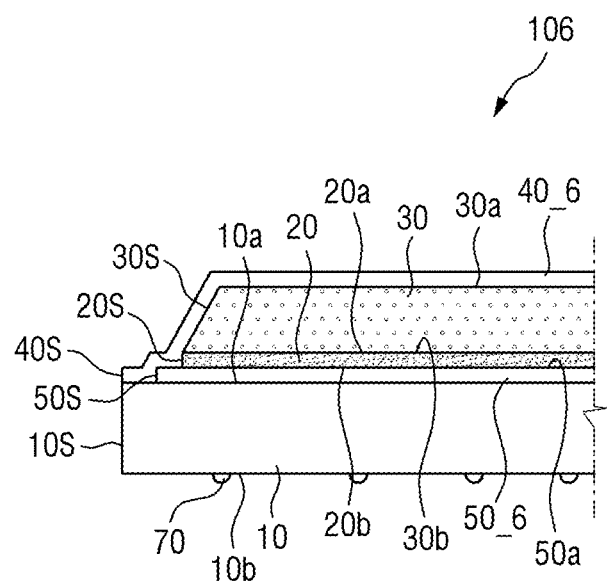
FIG. 10 is a cross-sectional view of an optical member according to some exemplary embodiments.

FIG. 10 is a cross-sectional view of an optical member 106 according to some exemplary embodiments.

In FIG. 10, a case where a barrier layer 50_6 of the optical member 106 does not cover the entire upper surface 10a of a light guide plate 10 is illustrated. That is, unlike as seen in FIG. 9, a side surface 50S of the barrier layer 50_6 may not be aligned with a side surface 10S of the light guide plate 10, but may be located inside the side surface 10S of the light guide plate 10. The barrier layer 50_6 exposes an edge portion of the upper surface 10a of the light guide plate 10. A side surface 20S of a first low refractive layer 20 may be aligned with the side surface 50S of the barrier layer 50_6 or located inside the side surface 50S of the barrier layer 50_6. That is, the side surface 20S of the first low refractive layer 20 may not protrude further than the side surface 50S of the barrier layer 50_6.

A passivation layer 40_6 completely overlaps a wavelength conversion layer 30 and extends further outward from the wavelength conversion layer 30 to cover a side surface 30S of the wavelength conversion layer 30 and the side surface 20S of the first low refractive layer 20. In addition, the passivation layer 40_6 may cover an upper surface 50a of the barrier layer 50_6 exposed by the first low refractive layer 20. In this manner, the passivation layer 40_6 may include an additional step portion due to the extension of the barrier layer 50_6 beyond the side surface 20S of the first low refractive layer 20. Furthermore, the passivation layer 40_6 may extend up to the upper surface 10a of the light guide plate 10 exposed by the barrier layer 50_6.

Although the barrier layer 50_6 does not cover the entire upper surface 10a of the light guide plate 10, the barrier layer 50_6 contacts the passivation layer 40_6 at an edge portion of the optical member 106, thereby maintaining the overall sealing structure. Therefore, the degree of freedom in selecting the constituent material(s) of the light guide plate 10 can be increased similar to as described in association with FIG. 9.

Figure 11:
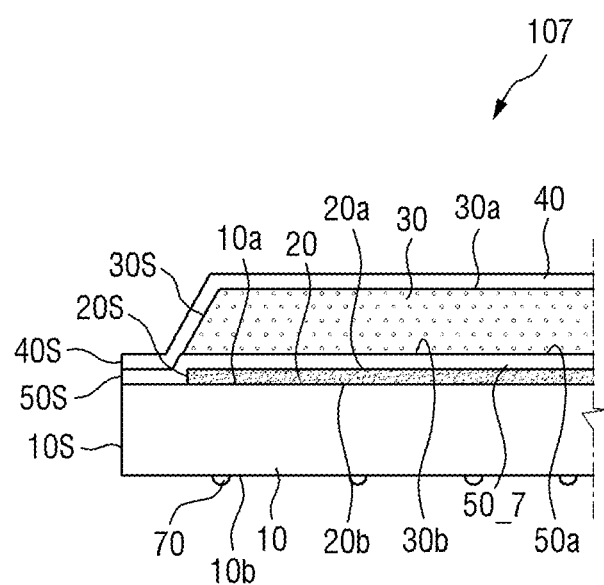
FIGS. 11, 12, and 13 re cross-sectional views of optical members according to various exemplary embodiments.
Figure 12:
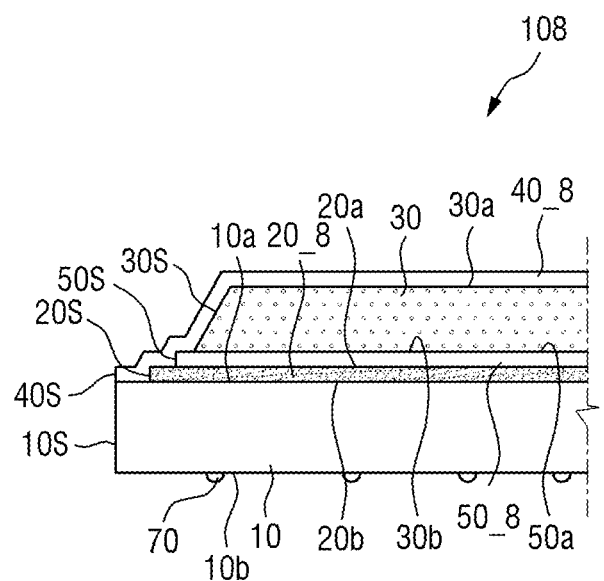
Figure 13:
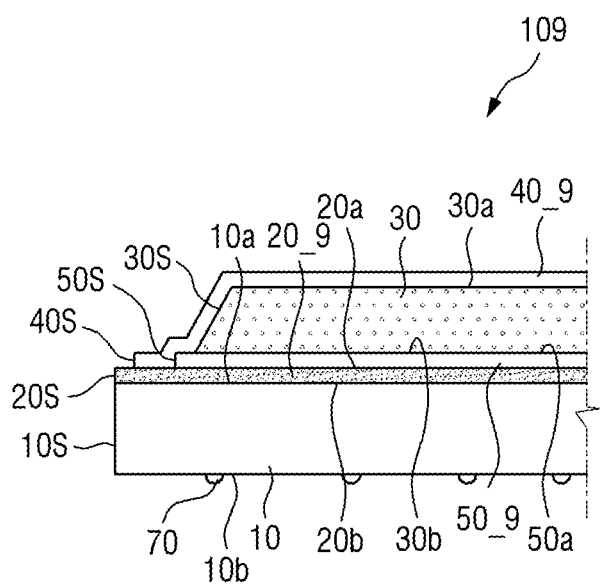

FIGS. 11 through 13 are cross-sectional views of optical members 107 through 109 according to various exemplary embodiments. In FIGS. 11 through 13, a case where a barrier layer 50_7, 50_8, or 50_9 of an optical member 107, 108 or 109 is formed on a first low refractive layer 20, 20_8, or 20_9 is illustrated.

Referring to FIG. 11, the first low refractive layer 20 is disposed on an upper surface 10a of a light guide plate 10 of the optical member 107. The first low refractive layer 20 covers most of the upper surface 10a of the light guide plate 10, but may expose part of an edge of the light guide plate 10.

The barrier layer 50_7 is disposed on an upper surface 20a of the first low refractive layer 20. The barrier layer 50_7 completely covers the first low refractive layer 20. The barrier layer 50_7 may extend up to the upper surface 10a of the light guide plate 10 exposed by the first low refractive layer 20.

A wavelength conversion layer 30 is disposed on an upper surface 50a of the barrier layer 50_7. The wavelength conversion layer 30 exposes an edge of the barrier layer 50_7, and a side surface 30S of the wavelength conversion layer 30 may be aligned with a side surface 20S of the first low refractive layer 20 or located further inwards than the side surface 20S of the first low refractive layer 20. That is, the side surface 30S of the wavelength conversion layer 30 may not protrude further than the side surface 20S of the first low refractive layer 20.

A passivation layer 40 is disposed on the wavelength conversion layer 30. The passivation layer 40 may cover an upper surface 30a and the side surface 30S of the wavelength conversion layer 30 and extend outward to contact an exposed portion of the upper surface 50a of the barrier layer 50_7.

Although a side surface 50S of the barrier layer 50_7 and a side surface 40S of the passivation layer 40 are all aligned with a side surface 10S of the light guide plate 10 in the drawing, at least one of the side surface 50S of the barrier layer 50_7 and the side surface 40S of the passivation layer 40 may be located further inwards than the side surface 10S of the light guide plate 10.

Referring to FIG. 12, the optical member 108 is different from the optical member 107 of FIG. 11 in that the first low refractive layer 20_8 is not completely covered by the barrier layer 50_8, but a portion of the first low refractive layer 20_8 is covered by a passivation layer 40_8. For instance, the barrier layer 50_8 is disposed on an upper surface 20a of the first low refractive layer 20_8 to expose a side surface 20S of the first low refractive layer 20_8. A side surface 50S of the barrier layer 50_8 may be aligned with the side surface 20S of the first low refractive layer 20_8 or located further inwards than the side surface 20S of the first low refractive layer 20_8. That is, the side surface 50S of the barrier layer 50_8 may not protrude further than the side surface 20S of the first low refractive layer 20_8.

A wavelength conversion layer 30 is disposed on an upper surface 50a of the barrier layer 50_8, and the passivation layer 40_8 is disposed on the wavelength conversion layer 30. A side surface 30S of the wavelength conversion layer 30 is aligned with the side surface 50S of the barrier layer 50_8 or located inside the side surface 50S of the barrier layer 50_8. That is, the side surface 30S of the wavelength conversion layer 30 may not protrude further than the side surface 50S of the barrier layer 50_8. The passivation layer 40_8 covers an upper surface 30a and the side surface 30S of the wavelength conversion layer 30. The passivation layer 40_8 may extend outward to cover the side surface 50S of the barrier layer 50_8 and the exposed side surface 20S of the first low refractive layer 20_8 and also to contact an upper surface 10a of a light guide plate 10. In this manner, the passivation layer 40_8 has a step configuration due to the side surface 50S of the barrier layer 50_8 and the side surface of the first low refractive layer 20_8.

Referring to FIG. 13, the optical member 109 is different from the optical members 107 and 108 of FIGS. 11 and 12 in that the first low refractive layer 20_9 is not completely covered by the barrier layer 50_9 and a passivation layer 40_9. For instance, the first low refractive layer 20_9 is disposed on an upper surface 10a of a light guide plate 10, and the barrier layer 50_9 is disposed on an upper surface 20a of the first low refractive layer 20_9 to expose at least a side surface 20S of the low refractive layer 20_9. A side surface 50S of the barrier layer 50_9 may be aligned with a side surface 20S of the first low refractive layer 20_9 or located inside the side surface 20S of the first low refractive layer 20_9.

A wavelength conversion layer 30 is disposed on an upper surface 50a of the barrier layer 50_9, and the passivation layer 40_9 is disposed on the wavelength conversion layer 30. A side surface 30S of the wavelength conversion layer 30 is aligned with the side surface 50S of the barrier layer 50_9 or located inside the side surface 50S of the barrier layer 50_9. That is, the side surface 30S of the wavelength conversion layer 30 may not protrude further than the side surface 50S of the barrier layer 50_9. The passivation layer 40_9 covers an upper surface 30a and the side surface 30S of the wavelength conversion layer 30. The passivation layer 40_9 extends outward to contact the upper surface 50a of the barrier layer 50_9. A side surface 40S of the passivation layer 40_9 may be aligned with the side surface 20S of the first low refractive layer 20_9 or located inside the side surface 20S of the first low refractive layer 20_9. To this end, the passivation layer 40_9 has a step configuration due to the side surface 50S of the barrier layer 50_9.

As seen in FIGS. 11 through 13, the first low refractive layer 20, 20_8, or 20_9 is disposed on the upper surface 10a of the light guide plate 10 so that effective total reflection can occur on the upper surface 10a of the light guide plate 10. In addition, since the upper surface 30a, the side surface 30S, and the lower surface 30b of the wavelength conversion layer 30 are all sealed with the barrier layer 50_7, 50_8, or 50_9 and the passivation layer 40, 40_8, or 40_9, deterioration of the wavelength conversion layer 30 can be prevented. Even if the side surface 20S of the first low refractive layer 20, 20_8, or 20_9 is exposed without being covered by the barrier layer 50_7, 50_8, or 50_9 or the passivation layer 40, 40_8, or 40_9 (as in the structure of FIG. 13), the sealing structure of the wavelength conversion layer 30 can be maintained.

Figure 14:
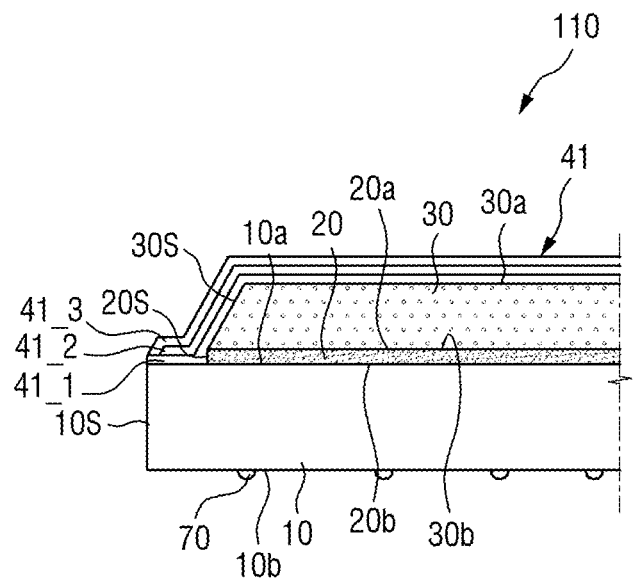
FIG. 14 is a cross-sectional view of an optical member according to some exemplary embodiments.

FIG. 14 is a cross-sectional view of an optical member 110 according to some exemplary embodiments. In FIG. 14, a passivation layer 41 may consist of a plurality of films. While the passivation layer 41 consists of three films in FIG. 14, it can consist of two films or four or more films.

Referring to FIG. 14, the passivation layer 41 of the optical member 110 includes a first passivation film 41_1, a second passivation film 41_2, and a third passivation film 41_3 which are sequentially laminated. The first through third passivation films 41_1 through 41_3 may all be inorganic films, or some of the first through third passivation films 41_1 through 41_3 may be organic films. For example, the first passivation film 41_1 contacting a wavelength conversion layer 30 may be an inorganic film, the second passivation film 41_2 located on the first passivation film 41_1 may be an organic film, and the third passivation film 41_3 may be an inorganic film. If more films are laminated, an inorganic film and an organic film may be alternately arranged.

The inorganic film may include, for example, at least one of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, and a metal thin film having secured light transmittance. When the passivation layer 41 includes a plurality of inorganic films, the constituent materials of the inorganic films may be, but are not necessarily, the same. The organic layer may include at least one of a silicone resin, an acrylic resin, and an epoxy resin.

Respective side surfaces of the first through third passivation films 41_1 through 41_3 may be aligned with each other, or any one of the side surfaces may protrude further than the other side surfaces. In some exemplary embodiments, the side surface of the second passivation film 41_2 disposed in the middle of the stack structure may be located relatively inward, and the first passivation film 41_1 and the third passivation film 41_3 may protrude from the side surface of the second passivation film 41_2 to contact each other. In this case, the second passivation film 41_2 is completely surrounded by the first and third passivation films 41_1 and 41_3. In this structure, if the second passivation film 41_2 is an organic film and the first and third passivation films 41_1 and 41_3 are inorganic films, the organic film is completely sealed by the inorganic films, while the first passivation film 41_1 and the third passivation film 41_3, which are the inorganic films, are made to contact each other. Therefore, this structure may be advantageous in increasing the adhesion between the films of the passivation layer 41.

Although not illustrated, a barrier layer, such as one of the barrier layers of FIGS. 9 through 13, may be utilized in the optical member 110, and may have a single layer or multilayer structure.

Figure 15A:
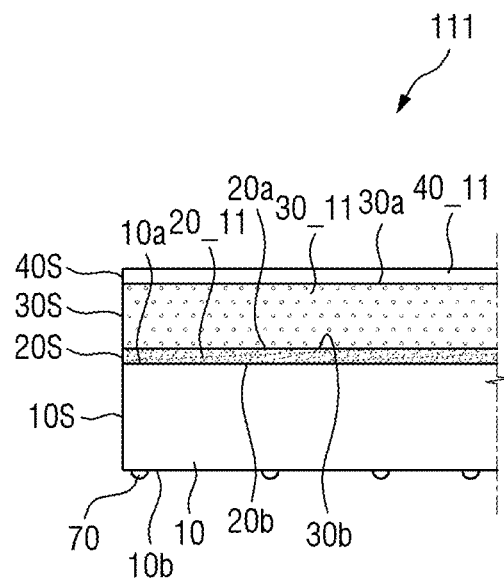
FIG. 15a is a cross-sectional view of an optical member according to some exemplary embodiments.

FIG. 15a is a cross-sectional view of an optical member 111 according to some exemplary embodiments.

As seen in FIG. 15a, a side surface 20S of a low refractive layer 20_11 and/or a side surface 30S of a wavelength conversion layer 30_11 may be exposed without being covered by a passivation layer 40_11. Referring to FIG. 15a, a side surface 10S of a light guide plate 10, the side surface 20S of the low refractive layer 20_11, the side surface 30S of the wavelength conversion layer 30_11, and a side surfaces 40S of the passivation layer 40_11 may all be aligned at at least one side surface of the optical member 111. Each side surface 10S, 20S, 30S or 40S of the optical member 111 may be a cut surface. This structure may be obtained, for example, when the optical member of FIG. 1 is used as a mother optical member and is cut into individual optical members, as will become more apparent below.

Figure 15B:
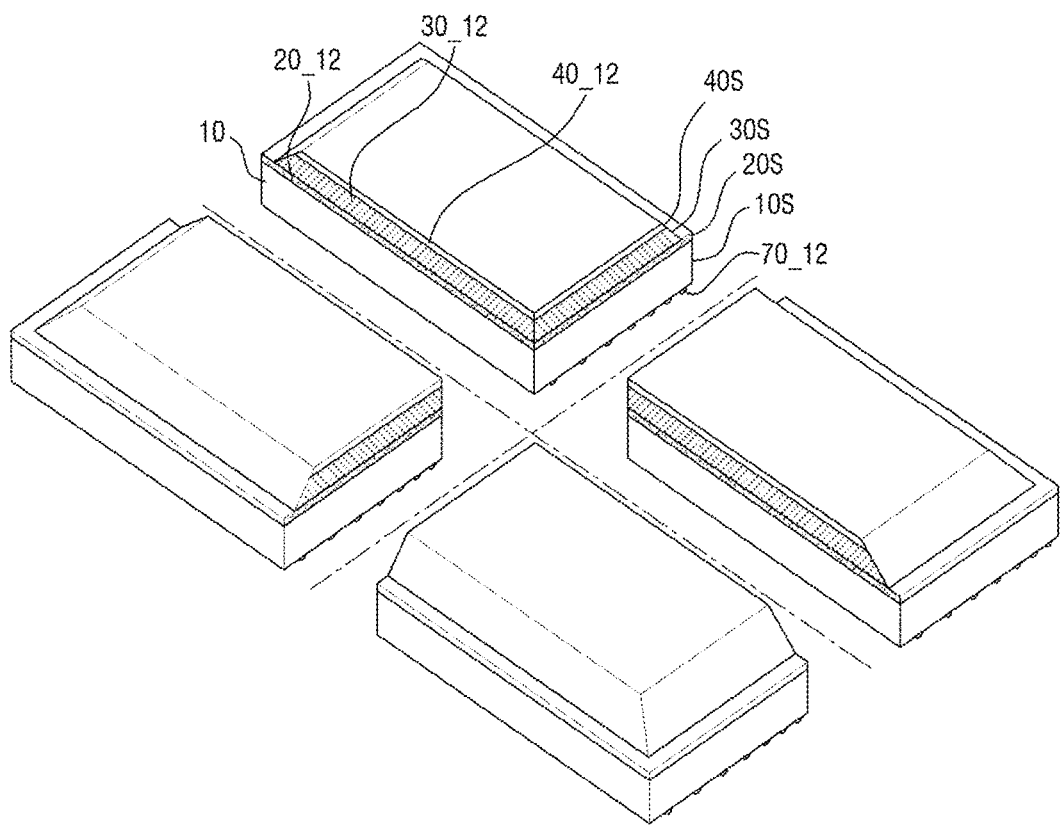
FIG. 15b is a perspective view of a mother optical member cut into quarters according to some exemplary embodiments.

FIG. 15b is a perspective view of a mother optical member cut into quarters. Referring to FIG. 15b, the mother optical member is prepared. The mother optical member has substantially the same structure and appearance as the optical member illustrated in FIG. 1, but the arrangement of scattering patterns 70_12 may be different. In other words, the arrangement density of the scattering patterns 70_12 of the mother optical member is not uniformly increased from one side surface toward the other side surface. Instead, the arrangement of the scattering patterns 70_12 in each cell area may be adjusted in consideration of the light incidence surface and the opposite surface of each individual optical member when the mother optical member is to cut.

When the prepared mother optical member is cut into a cross shape, four individual optical members are obtained such that each optical member includes a low refractive layer 20_12, a wavelength conversion layer 30_12, and a passivation layer 40_12. In FIG. 15b, each individual optical member has two cut side surfaces and two uncut side surfaces. The two uncut side surfaces may have the same structure (e.g., the side surface structure of FIG. 2) as the original side surfaces of the mother optical member, while the two cut side surfaces have the side surfaces illustrated in FIG. 15a.

In FIG. 15b, a case where the mother optical member is cut into four separate optical members is illustrated. However, it is also possible to obtain two individual optical members by cutting the mother optical member only in one direction. In this case, three side surfaces of each individual optical member may be uncut side surfaces having the side surface structure of FIG. 2, while one side surface is a cut surface having the side surface structure of FIG. 15a.

In FIG. 15a, since the side surface 20S of the low refractive layer 20_11 and the side surface 30S of the wavelength conversion layer 30_11 are exposed without being covered by the passivation layer 40_11 at at least one side surface of the optical member 111, the penetration of moisture/oxygen through the at least one side surface is possible. In this case, even if the wavelength conversion layer 30_11 is likely to deteriorate at the least one side surface, if other moisture/oxygen blocking structures are disposed at the at least one side surface or if process efficiency is given priority despite the deterioration of the wavelength conversion layer 30_11 in some edge areas, the structure of FIG. 15a may be applied to some side surfaces of the optical member 111.

Figure 16:
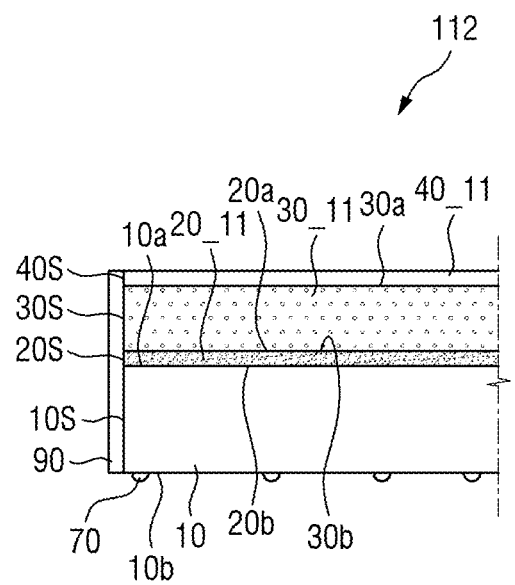
FIG. 16 is a cross-sectional view of an optical member according to some exemplary embodiments.

FIG. 16 is a cross-sectional view of an optical member 112 according to some exemplary embodiments.

Referring to FIG. 16, the optical member 112 is different from the optical member 111 of FIG. 15A in that it further includes a protective film 90 covering a side of the optical member 112. The protective film 90 may cover an exposed side surface 30S of a wavelength conversion layer 30_11 and an exposed side surface 20S of a low refractive layer 20_11. Also, the protective film 90 may cover a side surface 40S of a passivation layer 40_11 and/or a side surface 10S of a light guide plate 10. That is, the protective film 90 may cover the entire side of the optical member 112.

In some exemplary embodiments, the protective film 90, like the passivation layer 40, may be made of an inorganic material. For example, the protective film 90 may include at least one of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, and a metal thin film having secured light transmittance. In some exemplary embodiments, the protective film 90 may be made of silicon nitride. The protective film 90 may be formed by, for example, cutting the optical member of FIG. 1 and then depositing an inorganic material on a corresponding cut surface.

In some exemplary embodiments, a barrier film or a sealing tape may be applied as the protective film 90. In this case, the protective film 90 may be selectively attached only to a desired portion, for example, the side surface 30S of the wavelength conversion layer 30_11 and the side surface 20S of the low refractive layer 20_11.

As seen in FIG. 16, the exposed side surface 30S of the wavelength conversion layer 30_11 and the exposed side surface 20S of the low refraction layer 20_11 are covered with the protective film 90 to maintain a sealing structure. Therefore, even when four sides of the optical member 112 are all cut surfaces and the side surfaces 10S, 20S, 30S and 40S of the optical member 112 are aligned with each other, the overall sealing structure can be maintained by placing the protective film 90 on each of the exposed sides.

Figure 17:
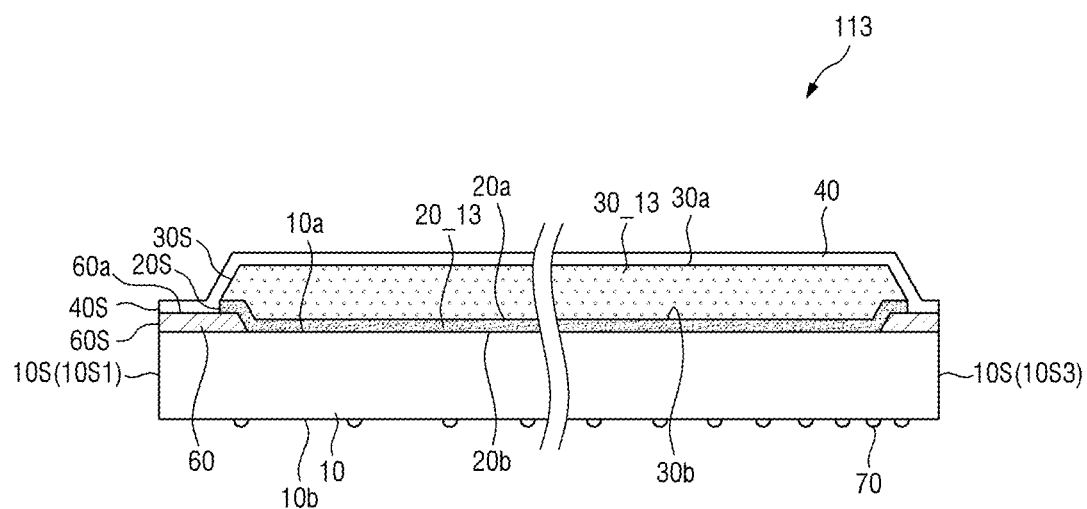
FIGS. 17 and 18 are cross-sectional views of optical members according to various exemplary embodiments.
Figure 18:
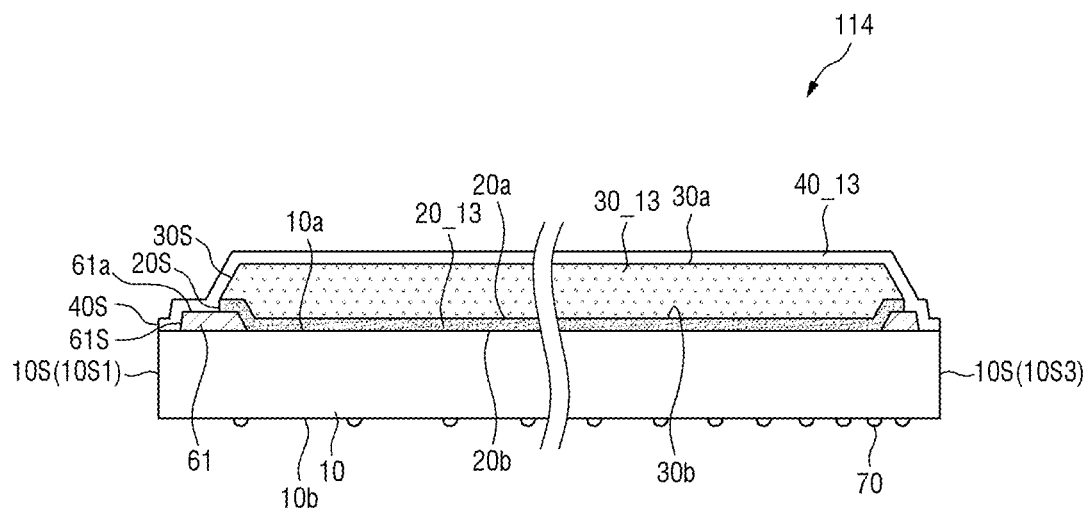

FIGS. 17 and 18 are cross-sectional views of optical members 113 and 114 according to embodiments.

Referring to FIGS. 17 and 18, the optical members 113 and 114 are different from the optical member 100 of FIG. 2 in that they further include light transmission blocking patterns 60 and 61. The light transmission blocking patterns 60 and 61 absorb or reflect incident light to partially or completely block the transmission of light in a corresponding area. The light transmittance of each of the light transmission blocking patterns 60 and 61 is lower than that of an adjacent first low refractive layer 20_13.

In some exemplary embodiments, each of the light transmission blocking patterns 60 and 61 may include a reflective layer. The reflective layer may include a light reflecting material having high reflectance, such as a metal. In another example, the reflective layer, like a reflective polarizing film, may have a structure in which a plurality of layers having different refractive indices are laminated. The reflective layer may be directly deposited or coated on an upper surface 10a of a light guide plate 10. In another example, a separate member including a reflective layer may be attached through an adhesive layer.

In some exemplary embodiments, each of the light transmission blocking patterns 60 and 61 may include a light absorbing layer. The light absorbing layer may include a light absorbing material, such as a black pigment or a dye. The light absorbing layer may be directly coated on the upper surface 10a of the light guide plate 10 or may be attached through an adhesive layer.

Each of the light transmission blocking patterns 60 and 61 is disposed at edge portions of the upper surface 10a of the light guide plate 10. The amount of light output from the upper surface 10a of the light guide plate 10 may differ from area to area. For example, near a light incidence surface 10S1, a relatively large amount of light enters the upper surface 10a, of is the light guide plate 10 at an angle smaller than a total reflection critical angle. Therefore, the amount of light output near the light incidence surface 10S1 may be larger than that in other areas. In addition, if the first low refractive layer 20_13 is disposed on the upper surface 10a of the light guide plate 10 to be integrated with the upper surface 10a, the critical angle becomes larger than that of an air layer. Therefore, the amount of light output near the light incidence surface 10S1 can be further increased. Near an opposite surface 10S3 or other side surfaces 10S2 and 10S4 (see FIG. 1), light reflected by an adjacent housing or chassis may also be emitted upward without following a light guide path. In this regard, the amount of output light may be larger at the edge portions of the light guide plate 10 than in a central portion, and this can be visually recognized as light leakage on a display screen.

Each of the light transmission blocking patterns 60 and 61 is disposed at the edge portions of the light guide plate 10, where a relatively large amount of light is output, in order to block light leakage or increase luminance uniformity. In some exemplary embodiments, each of the light transmission blocking patterns 60 and 61 may be disposed in a quadrilateral frame shape at four edge portions of the light guide plate 10. A width of each of the light transmission blocking patterns 60 and 61 may be uniform at each edge portion, but may be greatest at an edge portion near the light incidence surface 10S1 to which a relatively large amount of light is input, such as illustrated in association with the respective portions of the light transmission blocking pattern 61 of the FIG. 18. In some exemplary embodiments, each of the light transmission blocking patterns 60 and 61 may be disposed only at the edge portion near the light incidence surface 10S1 to which a relatively large amount of light is input, or only at the edge portions near the light incidence surface 10S1 and the opposite surface 10S3.

The first low refractive layer 20_13 is disposed on the upper surface 10a of the light guide plate 10 having the light transmission blocking pattern 60 or 61. The first low refractive layer 20_13 may cover the entire upper surface 10a of the light guide plate 10 inside the light transmission blocking pattern 60 or 61 and extend up to an upper surface 60a or 61a of the light transmission blocking pattern 60 or 61 to partially overlap the transmission blocking pattern 60 or 61. Side surfaces 20S of the first low refractive layer 20_13 may be located in the middle of the upper surface 60a or 61a of the light transmission blocking pattern 60 or 61. As such, outer side surfaces 60S or 61S of the light transmission blocking pattern 60 or 61 may protrude outward from the side surfaces 20S of the first low refractive layer 20_13.

A wavelength conversion layer 30_13 disposed on an upper surface 20a of the first low refractive layer 20 may also partially overlap the light transmission blocking pattern 60 or 61. A passivation layer 40 or 40_13 may cover an upper surface 30a and side surfaces 30S of the wavelength conversion layer 30_13, cover the side surfaces 20S of the first low refractive layer 20_13, and extend up to the upper surface 60a or 61a of the light transmission blocking pattern 60 or 61. Accordingly, part of edge portions of the passivation layer 40 or 40_13 may directly contact the upper surface 60a or 61a of the light transmission blocking pattern 60 or 61, as well as include a step configuration in the outer side portions.

If a light transmission blocking pattern 60 or 61 is made of an inorganic material, and, thus, has a moisture/oxygen blocking ability, even when the passivation layer 40 is terminated on the upper surface 60a of the light transmission blocking pattern 60 and the outer side surfaces 60S of the light transmission blocking pattern 60 are exposed as illustrated in FIG. 17, the sealing structure for the wavelength conversion layer 30_13 is maintained. However, if the light transmission blocking pattern 60 or 61 is made of an organic material, and, thus, does not have a sufficient moisture/oxygen blocking ability, the passivation layer 40 or 40_13 may be formed to cover side surfaces 60S or 61S of the light transmission blocking pattern 60 or 61. For example, if the light transmission blocking pattern 61 is located inside the side surfaces 10S of the light guide plate 10 to partially expose the upper surface 10a at the edge portions of the light guide plate 10 as illustrated in FIG. 18, the passivation layer 40_13 may cover the outer surfaces 61S of the light transmission blocking pattern 61 and extend up to the exposed upper surface 10a of the light guide plate 10.

Figure 19:
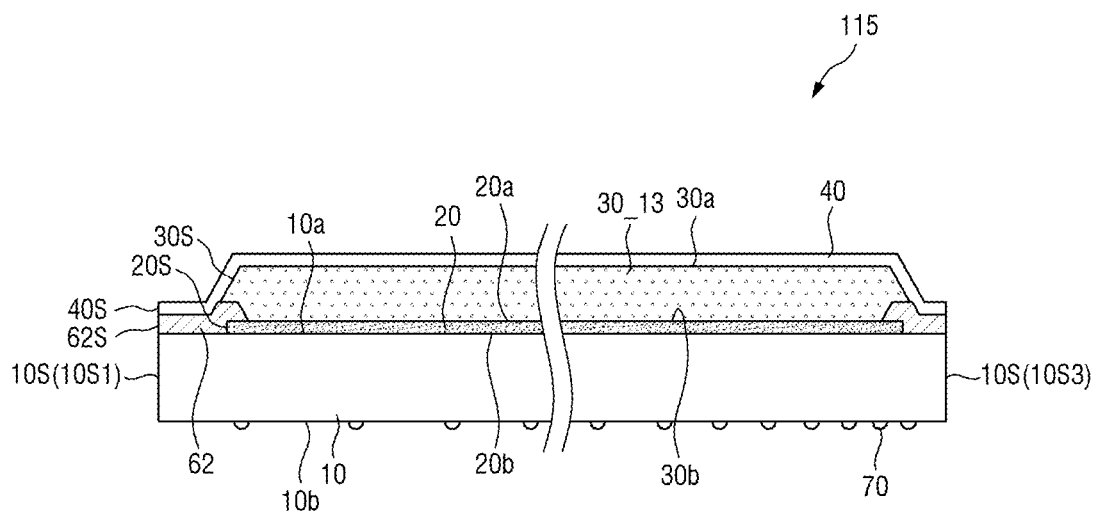
FIGS. 19 and 20 are cross-sectional views of optical members according to various exemplary embodiments.
Figure 20:
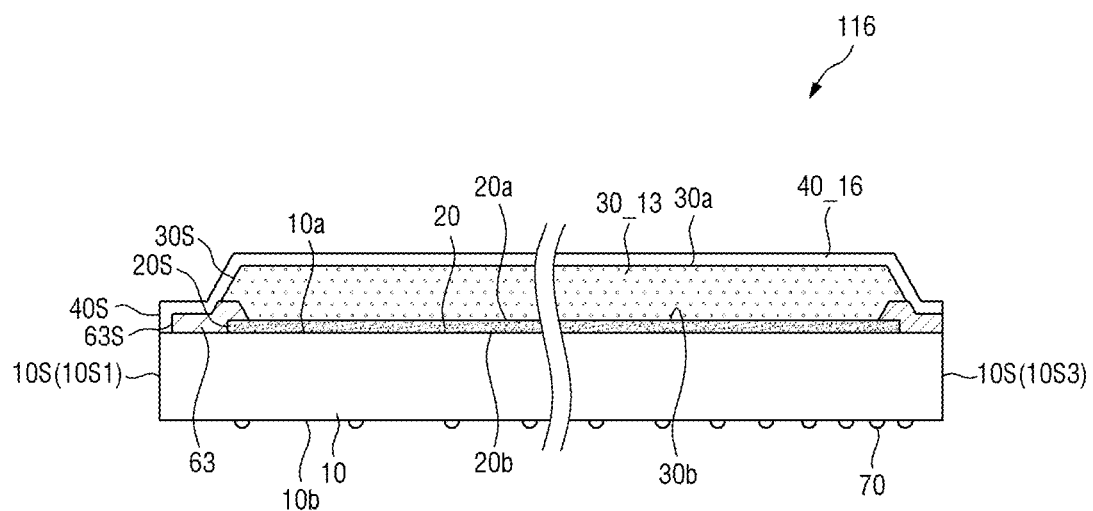

FIGS. 19 and 20 are cross-sectional views of optical members 115 and 116 according to various exemplary embodiments. In FIGS. 19 and 20, the order in which a light transmission blocking pattern 62 or 63 and a first low refractive layer 20 are laminated may be changed from the optical members 113 and 114 of FIGS. 17 and 18.

Referring to FIGS. 19 and 20, each of light transmission blocking patterns 62 and 63 of the optical members 115 and 116 may be disposed on a light guide plate 10 having a first low refractive layer 20. At least a portion of each of the light transmission blocking patterns 62 and 63 is disposed on an upper surface 20a of the first low refractive layer 20. Each of the light transmission blocking patterns 62 and 63 may cover side surfaces 20S of the first low refractive layer 20.

In some exemplary embodiments, outer side surfaces 62s of the light transmission blocking pattern 62 may be exposed without being covered by a passivation layer 40, as illustrated in FIG. 19. The outer side surfaces 62S of the light transmission blocking pattern 62 may be aligned with side surfaces 10S of the light guide plate 10.

In some exemplary embodiments, outer side surfaces 63S of the light transmission blocking pattern 63 may be covered by the passivation layer 40_16, as illustrated in FIG. 20. The outer side surfaces 63S of the light transmission blocking pattern 63 may be located further inwards than the side surfaces 10S of the light guide plate 10 and expose an upper surface 10a at edge portions of the light guide plate 10. The passive layer 40_13 may cover the outer surfaces 63S of the light transmission blocking pattern 63 and extend further outward to directly contact the exposed upper surface 10a of the light guide plate 10.

Figure 21:
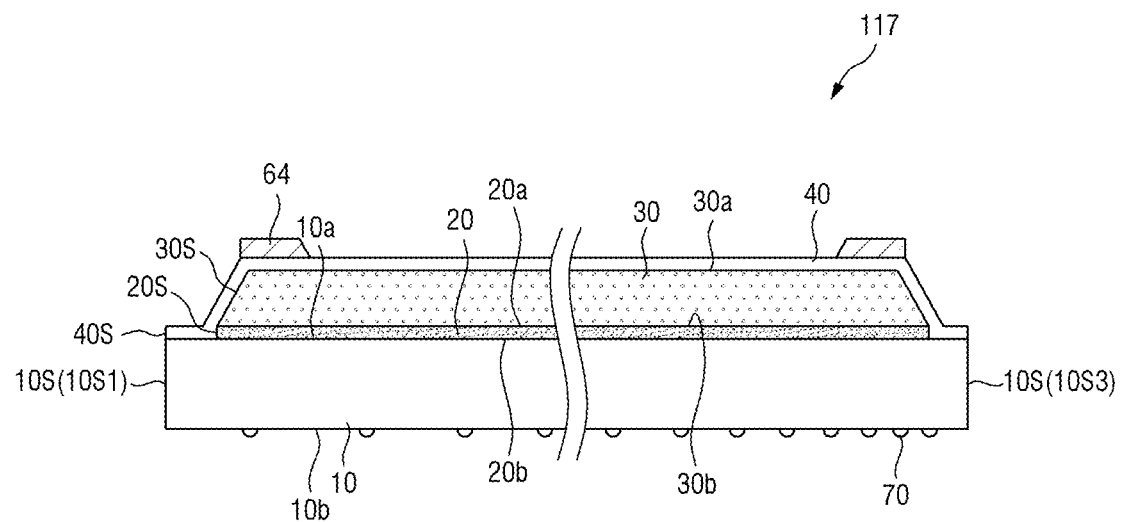
FIGS. 21 and 22 are cross-sectional views of optical members according to various exemplary embodiments.
Figure 22:
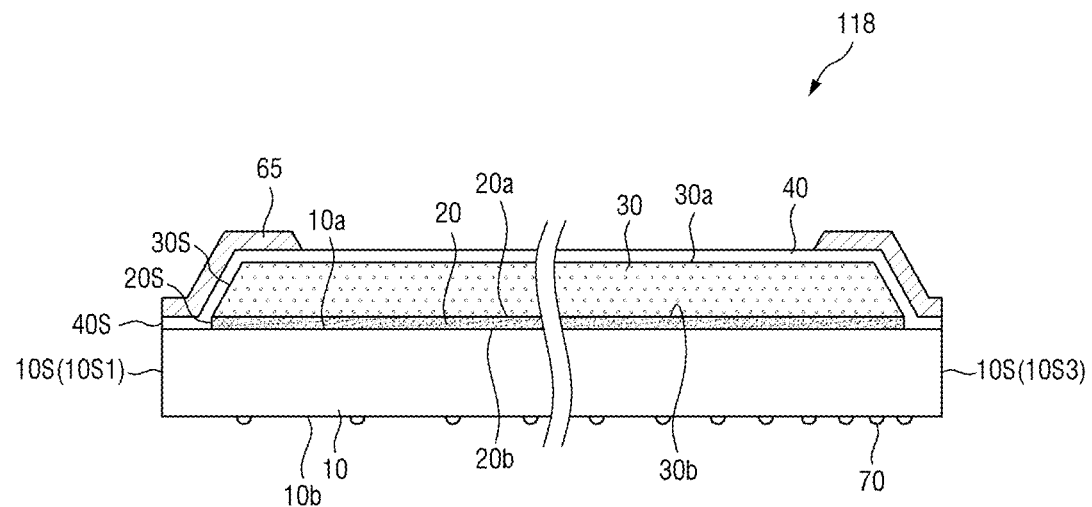

FIGS. 21 and 22 are cross-sectional views of optical members 117 and 118 according to various exemplary embodiments. In FIGS. 21 and 22, the optical members 117 and 118 are different from the optical members 113 through 116 of FIGS. 17 through 20 in that a light transmission blocking pattern 64 or 65 is disposed on a passivation layer 40.

Referring to FIGS. 21 and 22, each of the light transmission blocking patterns 64 and 65 of the optical members 118 and 119 is disposed on edge portions of the passivation layer 40. Each of the light transmission blocking patterns 64 and 65 may contact the surface of the passivation layer 40. Each of the light transmission blocking patterns 64 and 65 may at least partially overlap a wavelength conversion layer 30.

In some exemplary embodiments, the light transmission blocking pattern 64 may be disposed on the passivation layer 40 to overlap only n upper surface 30a of the wavelength conversion layer 30 and not overlap side surface 30S of the wavelength conversion layer 30, as illustrated in FIG. 21.

In some exemplary embodiments, the light transmission blocking pattern 65 may be disposed on the passivation layer 40 and extend outward to overlap the side surfaces 30S of the wavelength conversion layer 30, as illustrated in FIG. 22. Further, the light transmission blocking pattern 65 may extend onto the passivation layer 40 in contact with an upper surface 10a of a light guide plate 10.

FIG. 23 is a cross-sectioned, of an optical member 119 according to some exemplary embodiments.

Referring to FIG. 23, a light guide plate 11 of the optical member 119 further includes an edge surface 11r located between an upper surface 11a and/or a lower surface 11b and each side surface 11S. The upper surface 11a/lower surface 11b of the light guide plate 11 meets a side of the edge surface 11r, and each side surface 11S of the light guide plate 11 meets the other side of the edge surface 11r. The edge surface 11r is inclined with respect to the upper surface 11a/lower surface 11b and each side surface 11S. An angle formed by the edge surface 11r and the upper surface 11a/lower surface 11b and an angle formed by the edge surface 11r and each side surface 11S may be smaller than an angle formed by the upper surface 11a/lower surface 11b and each side surface 11S. The angle formed by the edge surface 11r and the upper surface 11a/lower surface 11b and the angle formed by the edge surface 11r and each side surface 11S may be obtuse angles. For example, each of the angles formed by the edge surface 11r and the upper surface 11a/lower face 11b and the angle formed by the edge surface 11r and each side surface 11S may be about 135 degrees.

The edge surface 11r can alleviate the sharpness of each edge portion of the light guide plate 11 and can prevent (or at least reduce) breakage due to an external impact. The edge surface 11r may be a flat surface, but may also be a curved surface.

When the light guide plate 11 includes the edge surface 11r, a light transmission blocking pattern 66 may be disposed on each edge portion of a passivation layer 40_23 and extend outward to be disposed on the edge surface 11r of the light guide plate 11, as illustrated in FIG. 23. When the passivation layer 40_23 is terminated on the upper surface 11a of the light guide plate 11, the light transmission blocking pattern 66 may cover side surfaces 40S of the passivation layer 40_23 and directly contact the edge surface 11r of the light guide plate 11.

In the above-described embodiments of FIGS. 17 through 20, the light transmission blocking pattern 60, 61, 62 or 63 blocks light incident from the light guide plate 10 to the wavelength conversion layer 30_13 at a corresponding position, thereby preventing light leakage or increasing luminance uniformity. In the embodiments of FIGS. 21 through 23, however, the light transmission blocking pattern 64, 65 or 66 blocks light finally emitted after passing through the wavelength conversion layer 30, thereby increasing the luminance uniformity.

Figure 24:
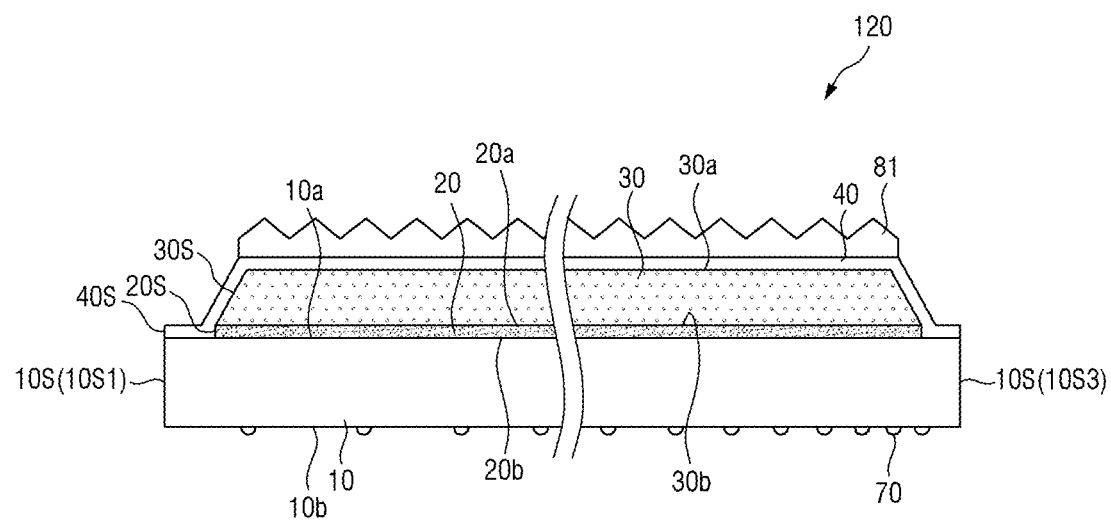
FIGS. 24 and 25 are cross-sectional views of optical members according to various exemplary embodiments.
Figure 25:
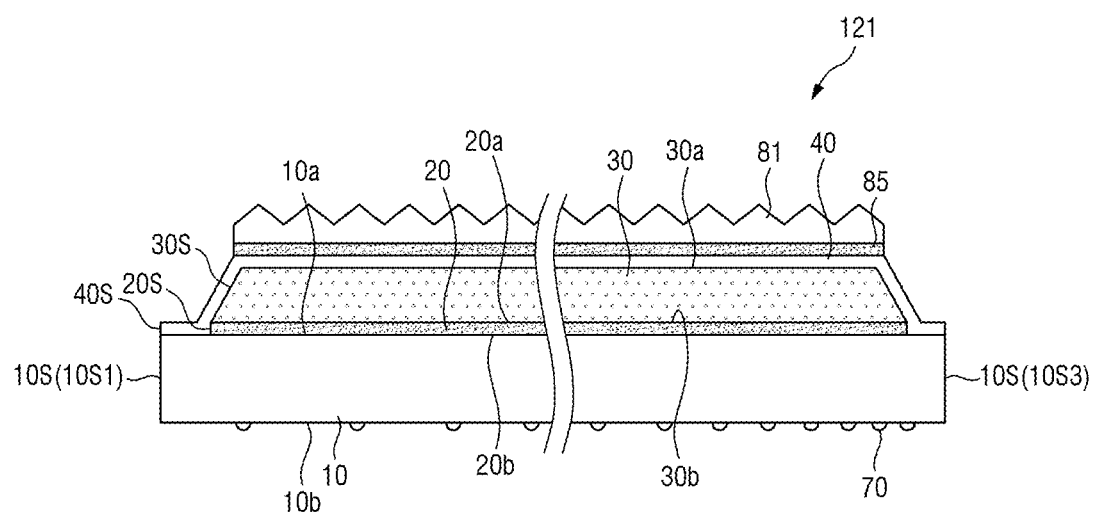

FIGS. 24 and 25 are cross-sectional views of optical members 120 and 121 according to various exemplary embodiments.

In FIGS. 24 and 25, each of the optical members 120 and 121 may further include an integrated optical functional layer 81. The optical function layer 81 is a layer for changing or controlling the traveling direction, phase, polarization state, etc. of light. For example, the optical functional layer 81 may perform at least one of refracting, condensing, diffusing, scattering, reflective polarization, and phase retardation of light. The optical functional layer 81 may be a layer performing the same optical function as a prism film, a diffusion film, a micro-lens film, a lenticular film, a polarizing film, a reflective polarizing film, a retardation film, etc., typically provided as separate films. The optical functional layer 81 may include an optical pattern whose surface is structured. The structured optical pattern includes an uneven surface. A cross-section of the uneven surface may have, for example, polygonal shapes, such triangles or trapezoids, part of circles, or ellipses, or amorphous random shapes. The uneven surface may include line patterns extending in one direction or independent dot patterns. However, the structured optical pattern may not necessarily have the uneven surface and may also have a flat surface, like a polarizing film or a reflective polarizing film.

Each of the optical members 120 and 121 includes a first optical functional layer 81 disposed on a passivation layer 40. Although a prism pattern is illustrated as the first optical functional layer 81 in the drawings, a micro-lens, or various other optical functional layers described above can be applied. The first optical functional layer 81 may be made of a material having a refractive index greater than that of a first low refractive layer 20. The refractive index of the first optical functional layer 81 may be, but is not limited to, 1.5 to 1.8.

The first optical functional layer 81 may overlap a wavelength conversion layer 30 disposed under the first optical functional layer 81. Side surfaces of the first optical functional layer 81 may be aligned with side surfaces 30S of the wavelength conversion layer 30 or may be disposed further inwards than the side surfaces 30S of the wavelength conversion layer 30. In some exemplary embodiments, the first optical functional layer 81 may directly contact the passivation layer 40 as illustrated in FIG. 24.

In some exemplary embodiments, the first optical functional layer 81 may be disposed on the passivation layer 40 with a bonding layer 85 interposed between the first optical functional layer 81 and the passivation layer 40, as illustrated in FIG. 25. The bonding layer 85 may be made of an adhesive material or a sticky material. In another example, the bonding layer 85 may be a double-sided tape. In another example, the bonding layer 85 may be made of a low refractive material exemplified as the constituent material of the first low refractive layer 20. It is also contemplated that the bonding layer 85 may be made of the same material as the first low refractive layer 20. When the bonding layer 85 is made of a low refractive material, an optical interface may be formed between the passivation layer 40 and the bonding layer 85, and between the bonding layer 85 and the first optical functional layer 81. Thus, optical modulation, such as refraction reflection, can be performed.

Figure 26:
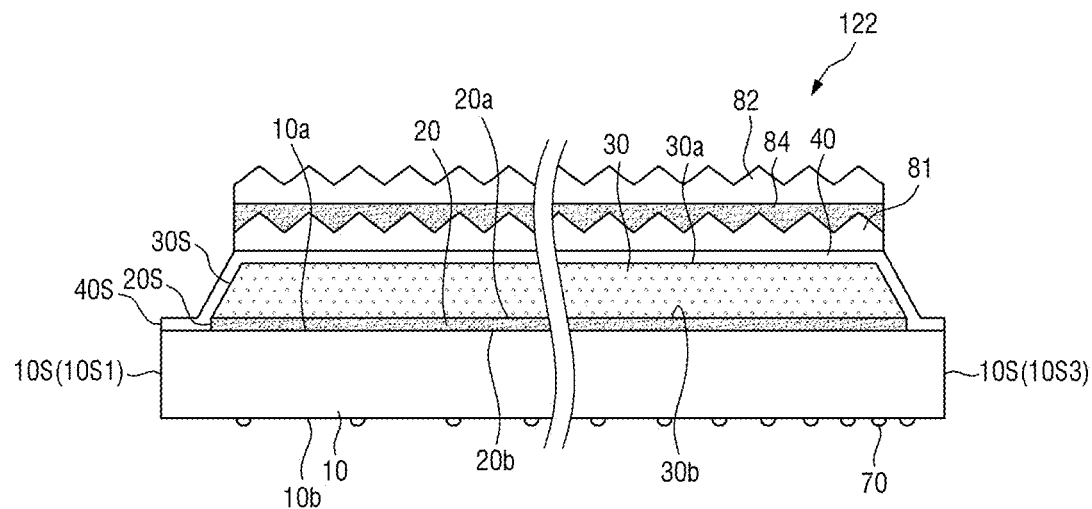
FIG. 26 is a cross-sectional view of an optical member according to some exemplary embodiments.

FIG. 26 is a cross-sectional view of an optical member 122 according to some exemplary embodiments. In FIG. 26, the optical member 122 may include a plurality of optical functional layers, as will become more apparent below.

Referring to FIG. 26, the optical member 122 is different from the optical member 120 of FIG. 24 in that the optical member 122 further includes a second optical functional layer 82 disposed on a first optical functional layer 81. A second low refractive layer 84 is interposed between the second optical functional layer 82 and the first optical functional layer 81. The second low refractive layer 84 may be made of a low refractive material exemplified as the constituent material of a first low refractive layer 20. The second low refractive layer 84 may be made of the same material as the first low refractive layer 20. A refractive index of the second low refractive layer 84 is smaller than a refractive index of the first optical functional layer 81. For example, a difference between the refractive index of the first optical functional layer 81 and the refractive index of the second low refractive layer 84 may be 0.2 or more.

When the first optical functional layer 81 includes surface irregularities, the second low refractive layer 84 may fill the surface irregularities of the first optical functional layer 81. The second low refractive layer 84 may fill the recessed portions of the first optical functional layer 81 and cover protruding portions. In some exemplary embodiments, the second low refractive layer 84 may completely fill a space between the first optical functional layer 81 and the second optical functional layer 82. An upper surface of the second low refractive layer 84 may be flat, but exemplary embodiments are not limited thereto.

The second optical functional layer 82 is disposed on an upper surface of the second low refractive layer 84. The second optical functional layer 82 may be made of a material having a refractive index greater than that of the second low refractive layer 84. The refractive index of the second optical functional layer 82 may be, but is not limited to, 1.5 to 1.8. The second optical functional layer 82 may have the same refractive index as the first optical functional layer 81.

The second low refractive layer 84 contributes to the coupling and optical functions of the first and second optical functional layers 81 and 82. For instance, since the second low refractive layer 84 completely fills the space between the first optical functional layer 81 and the second optical functional layer 82, mechanically stable adhesion can be achieved between the first optical functional layer 81 and the second optical functional layer 82. In addition, since a material having a refractive index lower than at of the first optical functional layer 81 is used for the second low refractive layer 84, the optical function of the first optical functional layer 81 can be maintained to some extent. Generally, the surface of an optical functional layer has a structured pattern shape to change the path of light through refraction or reflection. This optical modulation function is based on the assumption that the optical functional layer has a different refractive index from an adjacent medium on its surface.

For example, if the second low refractive layer 84 has a refractive index similar to that of the first optical functional layer 81, the path of light is hardly changed at an interface between the second low refractive layer 84 and the first optical functional layer 81 regardless of the surface shape of the first optical functional layer 81. In the structure of FIG. 26, however, the refractive index of the second low refractive layer 84 is made lower than the refractive index of the first optical function layer 81 to form an optical interface between the second low refractive layer 84 and the first optical function layer 81. Thus, the path of light can be changed by, for example, refraction. Such an optical interface may be similarly formed between the second low refractive layer 84 and the second optical functional layer 82.

Although a prism pattern is illustrated as a pattern of the second optical functional layer 82 in FIG. 26, a micro-lens or various other optical functional layers described above can be additionally or alternatively applied. In addition, although a direction in which the prism pattern of the first optical function layer 81 extends and a direction in which the prism pattern of the second optical functional layer 82 extends are illustrated in the drawing as being parallel to each other, they may also be orthogonal to each other or intersect each other at other angles.

The optical members 100 through 122 according to the above-described various exemplary embodiments can be applied to a display device, a lighting device, etc. Hereinafter, exemplary embodiments of a display device including an optical member will be described.

Figure 27:
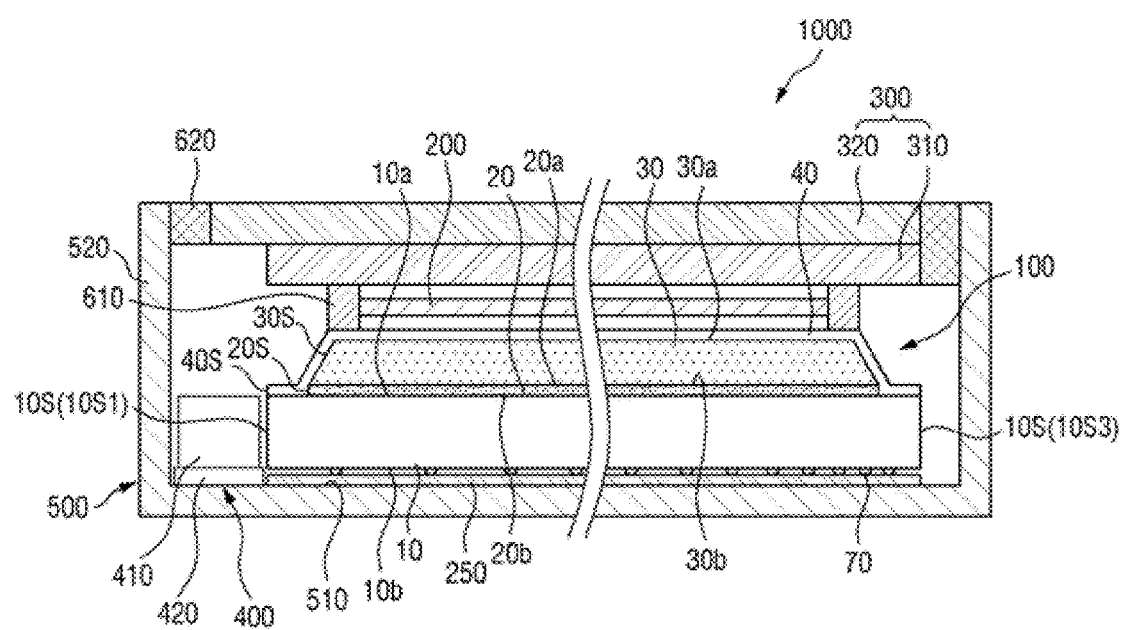
FIGS. 27 and 28 are cross-sectional views of display devices according to various exemplary embodiments.
Figure 28:
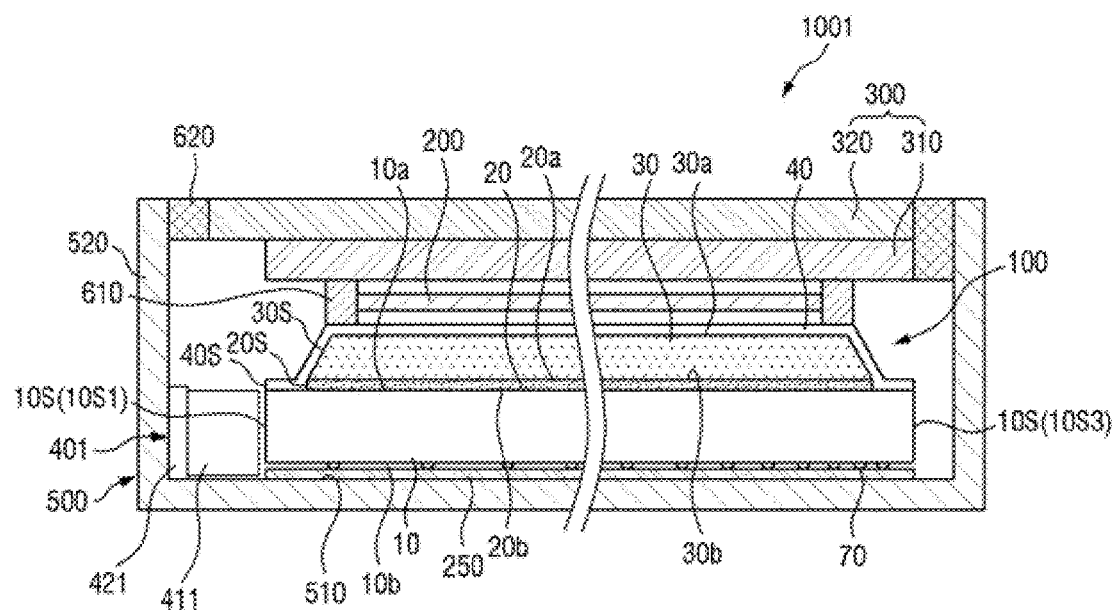

FIGS. 27 and 28 are cross-sectional views of display devices 1000 and 1001 according to various exemplary embodiments.

Referring to FIGS. 27 and 28, each of the display devices 1000 and 1001 includes a light source 400 or 401, an optical member 100 disposed in an emission path of the light source 400 or 401, and a display panel 300 disposed on the optical member 100. Although FIGS. 27 and 28 are shown including optical member 100, any one or more of the optical members 100 through 122 may be applied as the optical member 100. For convenience, the optical member 100 of FIG. 2 is described and illustrated in FIGS. 27 and 28.

Each of the light sources 400 and 401 is disposed on a side of the optical member 100. Each of the light sources 400 and 401 may be disposed adjacent to a light incidence surface 10S1 of a light guide plate 10 of the optical member 100. Each of the light sources 400 and 401 may include a plurality of point light sources or linear light sources. The point light sources may be LED light sources 410 or 411. The LED light sources 410 or 411 may be mounted on a printed circuit board 420 or 421. The LED light sources 410 or 411 may emit light of a blue wavelength.

In some exemplary embodiments, the LED light sources 410 may be side-emitting LEDs that emit light laterally as illustrated in FIG. 27. In this case, the printed circuit board 420 may be disposed on a bottom surface 510 of a housing 500. In some exemplary embodiments, the LED light sources 411 may be top-emitting LEDs that emit light upward as illustrated in FIG. 28. In this case, the printed circuit board 421 may be disposed on a sidewall 520 of the housing 500.

The light of the blue wavelength emitted from the LED light sources 410 or 411 is incident on the light guide plate 10 of the optical member 100. The light guide plate 10 of the optical member 100 guides the light and outputs the light through an upper surface 10a or a lower surface 10b of the light guide plate 10. A wavelength conversion layer 30 of the optical member 100 converts part of the light of the blue wavelength incident from the light guide plate 10 to another wavelength, such as a green wavelength and a red wavelength. Light of the green wavelength and light of the red wavelength are emitted upward together with the unconverted light of the blue wavelength and provided toward the display panel 300.

Each of the display devices 1000 and 1001 may further include a reflective member 250 disposed under the optical member 100. The reflective member 250 may include a reflective film or a reflective coating layer. The reflective member 250 reflects light output through the lower surface 10b of the light guide plate 10 of the optical member 100 back into the light guide plate 10.

The display panel 300 is disposed on the optical member 100. The display panel 300 receives light from the optical member 100 and displays an image. Examples of such a light-receiving display panel that receives light and displays an image include a liquid crystal display panel, an electrophoretic panel, etc. The liquid crystal display panel will hereinafter be described as an example of the display panel 300, but various other light-receiving display panels can be applied.

The display panel 300 may include a first substrate 310, a second substrate 320 facing the first substrate 310, and a liquid crystal layer (not illustrated) disposed between the first substrate 310 and the second substrate 320. The first substrate 310 and the second substrate 320 overlap each other. In some exemplary embodiments, any one of the first and second substrates 310 and 320 may be larger than the other substrate and protrude further outward than the other substrate. In the drawings, the second substrate 320 disposed on the first substrate 310 is larger and protrudes on a side where the light source 400 or 401 is disposed. The protruding area of the second substrate 320 may provide a space in which a driving chip or an external circuit board is mounted. Unlike in the drawings, the first substrate 310 disposed under the second substrate 320 may be larger than the second substrate 320 and may protrude outward. An overlapping area of the first substrate 310 and the second substrate 320 excluding the protruding area in the display panel 300 may be substantially aligned with side surfaces 10S of the light guide plate 10 of the optical member 100.

The optical member 100 may be coupled to the display panel 300 by an inter-module coupling member 610. The inter-module coupling member 610 may be shaped like a quadrilateral frame when seen from above, e.g., in a plan view. The inter-module coupling member 610 may be located at edge portions of the display panel 300 and the optical member 100. In some exemplary embodiments, a lower surface of the inter-module coupling member 610 is disposed on an upper surface of a passivation layer 40 of the optical member 100. The lower surface of the inter-module coupling member 610 may be disposed on the passivation layer 40 to overlap only an upper surface 30a of the wavelength conversion layer 30 and not overlap side surfaces 30S of the wavelength conversion layer 30. The inter-module coupling member 610 may include a polymer resin, an adhesive, or sticky tape.

In some exemplary embodiments, the inter-module coupling member 610 may further perform the function of the light transmission blocking patterns 60 through 66 described above with reference to FIGS. 17 through 23. For example, the inter-module coupling member 610 may include a light absorbing material, such as a black pigment or a dye, or may include a reflective material to perform a light transmission blocking function. In this case, the light transmission blocking patterns 60 through 66 of FIGS. 17 through 23 may be omitted or may be applied together with the inter-module coupling member 610 to further increase a light transmission blocking rate.

Each of the display devices 1000 and 1001 may further include the housing 500. The housing 500 has an open surface and includes the bottom surface 510 and sidewalls 520 connected to the bottom surface 510. The light source 400 or 401, the optical member 100 and the display panel 300 attached to each other, and the reflective member 250 may be accommodated in a space defined by the bottom surface 510 and the sidewalls 520. The light source 400 or 401, the reflective member 250, and the optical member 100 and the display panel 300 attached to each other are disposed on the bottom surface 510 of the housing 500. A height of the sidewalls 520 of the housing 500 may be substantially the same as a height of the optical member 100 and the display panel 300 attached to each other inside the housing 500. The display panel 300 may be disposed adjacent to an upper end of each sidewall 520 of the housing 500 and may be coupled to the upper end of each sidewall 520 of the housing 500 by a housing coupling member 620. The housing coupling member 620 may be shaped like a quadrilateral frame when seen from above. The housing coupling member 620 may include a polymer resin or an adhesive or sticky tape.

Each of the display devices 1000 and 1001 may further include at least one optical film 200. One or a plurality of optical films 200 may be accommodated in a space surrounded by the inter-module coupling member 610 between the optical member 100 and the display panel 300. Side surfaces of one or a plurality of optical films 200 may be in contact with and attached to inner side surfaces of the inter-module coupling members 610. Although there is a gap between the optical film 200 and the optical member 100, and between the optical film 200 and the display panel 300 in the drawings, the gap is may be omitted.

The optical film 200 may be at least one of prism film, a diffusion film, a micro-lens film, a lenticular film, a polarizing film, a reflective polarizing film, and a retardation film. Each of the display devices 1000 and 1001 may include a plurality of optical films 200 of the same type or different types. When a plurality of optical films 200 are applied, the optical films 200 may be placed to overlap each other, and side surfaces of the optical films 200 may be in contact with and attached to the inner side surfaces of the inter-module coupling member 610. The optical films 200 may be separated from each other, and an air layer may be disposed between adjacent optical films 200.

In some exemplary embodiments, the optical film 200 may be a composite film in which two or more optical functional layers are integrated. A composite film will now be described in detail with reference to FIG. 29.

Figure 29:
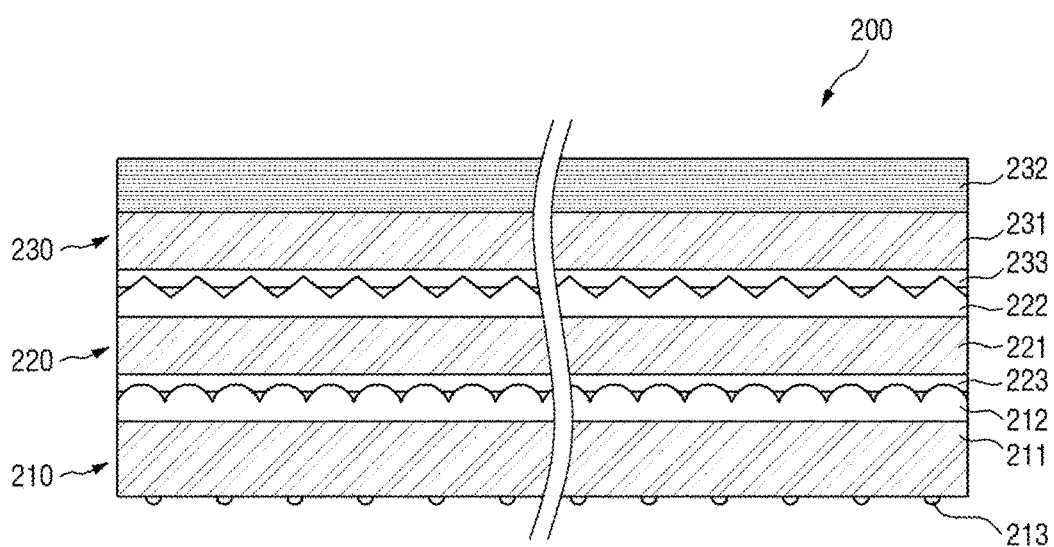
FIG. 29 is a cross-sectional view of an optical film according to some exemplary embodiments.

FIG. 29 is a cross-sectional view of an optical film 200 according to some exemplary embodiments. Referring to FIG. 29, the optical film 200 may include a first film 210, a second film 220, and a third film 230 integrated with each other.

The first film 210 may include a first base 211, a back coating layer 213 disposed on a lower surface of the first base 211, and a first optical pattern layer 212 disposed on an upper surface of the first base 211. When the optical film 200 is separated from the optical member 100, a back coating layer 213 may be omitted.

The second film 220 may include a second base 221, a first bonding resin layer 223 disposed on a lower surface of the second base 221, and a second optical pattern layer 222 disposed on an upper surface of the second base 221.

The third film 230 may include a third base 231, a second bonding resin layer 233 disposed on a lower surface of the third base 231, and an optical layer 232 disposed on an upper surface of the third base 231.

The first optical pattern layer 212 includes protruding portions and recessed portions, and part of the protruding portions may contact the first bonding resin layer 223 or partially penetrate into the first bonding resin layer 223 to be bonded to the first bonding resin layer 223. In some exemplary embodiments, an air layer may be disposed between the recessed portions of the first optical pattern layer 212 and the first bonding resin layer 223.

The second optical pattern layer 222 includes protruding portions and recessed portions, and part of the protruding portions may contact the second bonding resin layer 233 or partially penetrate into the second bonding resin layer 233 to be bonded to the second bonding resin layer 233. In some exemplary embodiments, an air layer is disposed between the recessed portions of the second optical pattern layer 222 and the second bonding resin layer 233.

In some exemplary embodiments, the first optical pattern layer 212 is a micro-lens pattern layer or a diffusion layer, the second optical pattern layer 222 is a prism pattern layer, and the optical layer 232 of the third film 230 is a reflective polarizing layer. In some exemplary embodiments, the first optical pattern layer 212 is a prism pattern layer, the second optical pattern layer 222 is a prism pattern layer (extending in a direction intersecting the prism pattern of the first optical pattern layer 212), and the optical layer 232 of the third film 230 is a reflective polarizing layer. The third base 231 of the third film 230 may be omitted, and the second bonding resin layer 233 can be disposed on a lower surface of the optical layer 232. In addition, various other optical functional layers can be used as the first optical pattern layer 212, the second optical pattern layer 222, and the optical layer 232. Also, two films or four or more films can be integrated and applied.

When the optical members 120, 121, and 122 including optical functional layers integrated with each other are used as in the embodiments of FIGS. 24 through 26, the entire optical film 200 or some films performing redundant optical functions may be omitted.

In the display devices 1000 and 1001 of FIGS. 27 and 28, the optical member 100 and the display panel 300 and further the optical film 200 are integrated with each other by the inter-module coupling member 610, and the display panel 300 and the housing 500 are coupled to each other by the housing coupling member 620. Therefore, even if a mold frame is omitted, a stable coupling of various members is possible, which, in turn, reduces the weight of each of the display devices 1000 and 1001. In addition, since the light guide plate 10 and the wavelength conversion layer 30 are integrated with each other, the thickness of each of the display devices 1000 and 1001 can be reduced. Furthermore, since side surfaces of the display panel 300 are coupled to the sidewalls 520 of the housing 500 by the housing coupling member 620, a bezel space on the display screen side can be eliminated or minimized.

Figure 30:
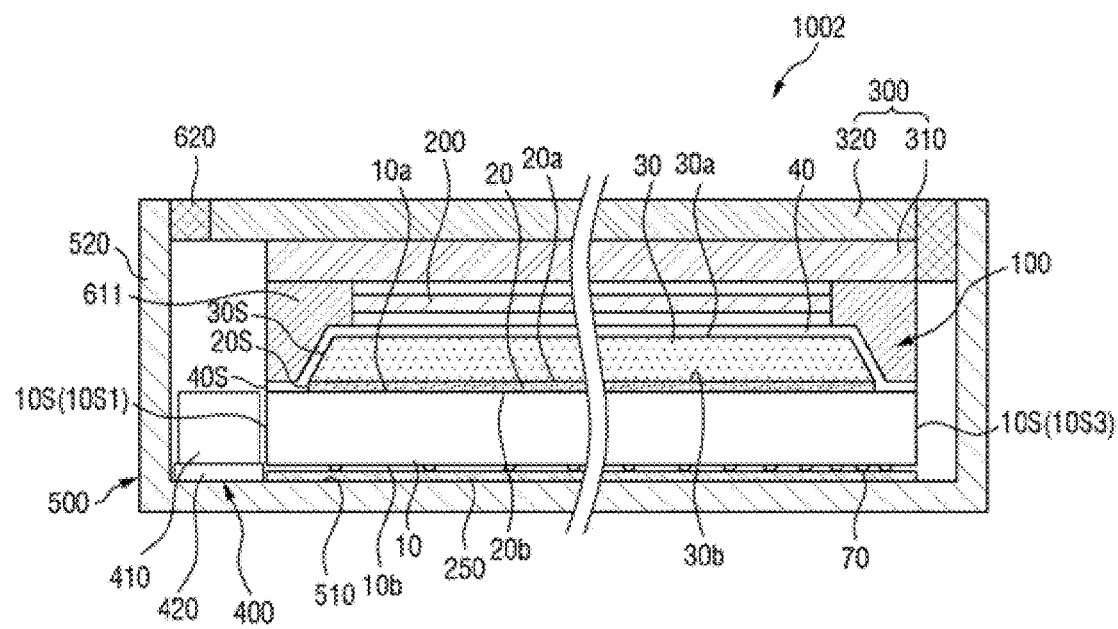
FIG. 30 is a cross-sectional view of a display device according to some exemplary embodiments.

FIG. 30 is a cross-sectional view of a display device 1002 according to some exemplary embodiments. In FIG. 30, the position/configuration of an inter-module coupling member 611 may be changed.

Referring to FIG. 30, the display device 1002 is different from the display device 1000 of FIG. 27 in that the inter-module coupling member 611 extends further outward on a passivation layer 40 to overlap side surfaces 30S of a wavelength conversion layer 30. Further, the inter-module coupling member 611 may extend onto the passivation layer 40 that is in contact with an upper surface 10a of a light guide plate 10. In some exemplary embodiments, outer side surfaces of the inter-module coupling member 611 may be aligned with side surfaces 10S of the light guide plate 10; however, exemplary embodiments are not limited thereto. Also, the outer side surfaces of the inter-module coupling member 611 may be aligned with side surfaces of an overlapping area of a first substrate 310 and a second substrate 320 of a display panel 300, in other words, side surfaces of the first substrate 310 relatively smaller than the second substrate 320.

Figure 31:
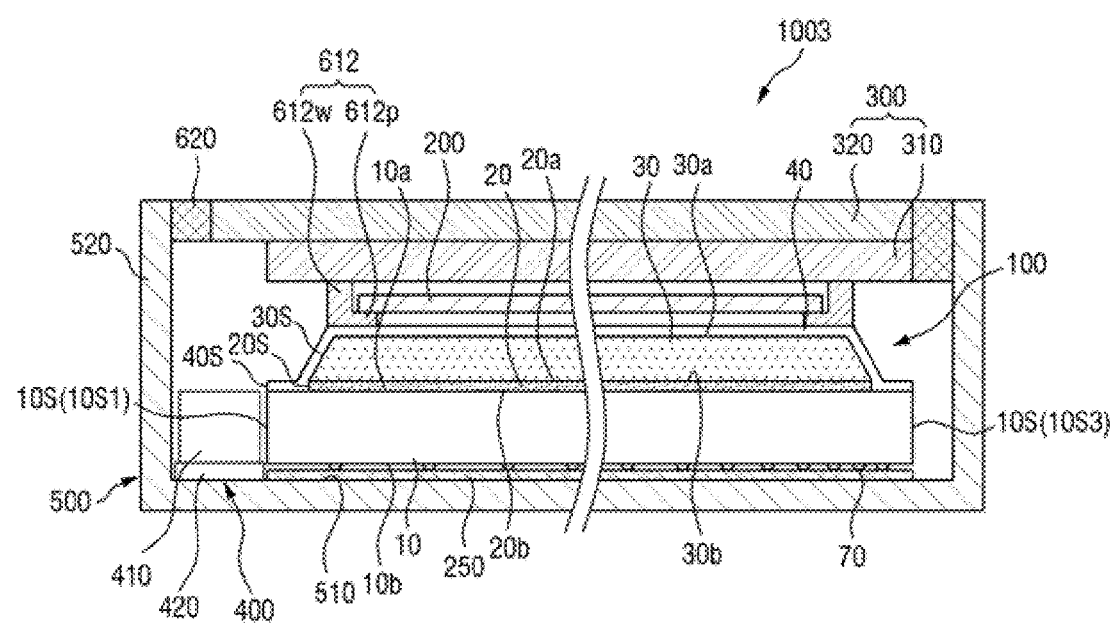
FIG. 31 is a cross-sectional view of a display device according to some exemplary embodiments.

FIG. 31 is a cross-sectional view of a display device 1003 according to some exemplary embodiments. The display device 1003 is different from the display device 1000 of FIG. 27 in that an inter-module coupling member 612 includes a sidewall portion 612w and a lower protruding portion 612p.

For example, the sidewall portion 612w is substantially the same as the inter-module coupling member 610 of FIG. 27. The lower protruding portion 612p is connected to the sidewall portion 612w and protrudes inward from a lower end of the sidewall portion 612w. The lower protruding portion 612p is thinner than the sidewall portion 612w. A lower surface of the lower protruding portion 612p may be attached to an upper surface of a passivation layer 40 of an optical member 100, and an upper surface of the lower protruding portion 612p may be separated from a display panel 300. An optical film 200 may be inserted into a space between the upper surface of the lower protruding portion 612p and the display panel 300. A lower surface of the optical film 200 may be disposed on and attached to the upper surface of the lower protruding portion 612p. Side surfaces of the optical film 200 may contact the sidewall portion 612w. However, even if the side surfaces of the optical film 200 are separated from the sidewall portion 612w, the optical film 200 can be fixed by being coupled to the lower protruding portion 612p. The optical film 200 may be separated from the display panel 300. Accordingly, the optical film 200 may be stably fixed by being attached to the upper surface of the lower protruding portion 612p of the inter-module coupling member 612.

Figure 32:
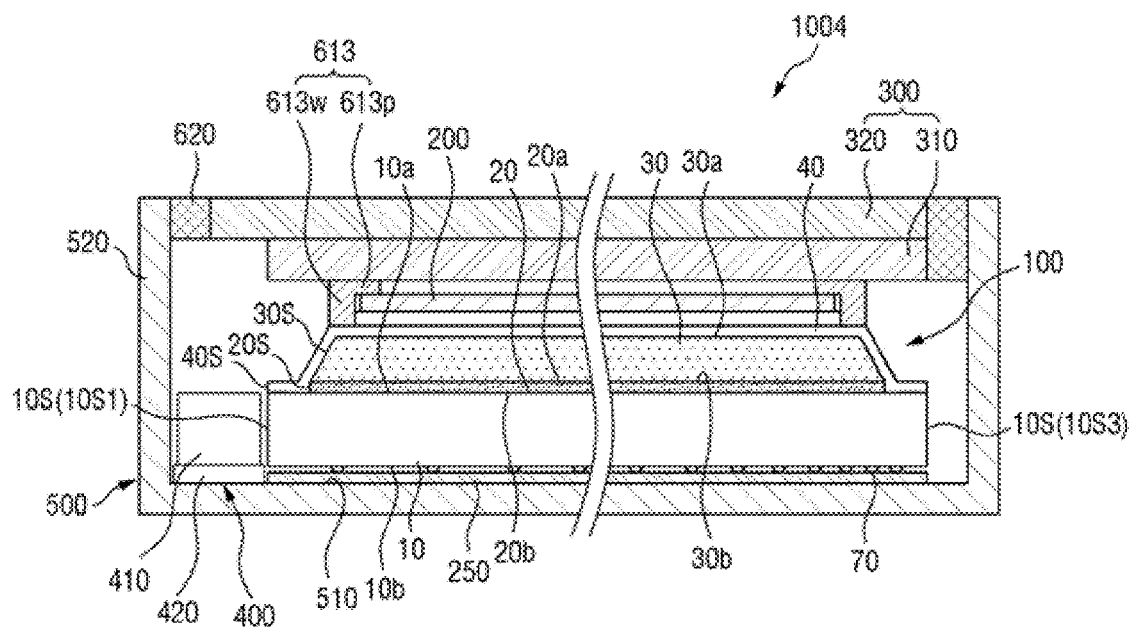
FIG. 32 is a cross-sectional view of a display device according to some exemplary embodiments.

FIG. 32 is a cross-sectional view of a display device 1004 according to some exemplary embodiments. The display device 1004 is different from the display device 1000 of FIG. 27 in that an inter-module coupling member 613 includes a sidewall portion 613w and an upper protruding portion 613p.

The sidewall portion 613w is substantially the same as the inter-module coupling member 610 of FIG. 27. The upper protruding portion 613p is connected to the sidewall portion 613w and protrudes inward from an upper end of the sidewall portion 613w. The upper protruding portion 613p is thinner than the sidewall portion 613w. An upper surface of the upper protruding portion 613p may be attached to a display panel 300, and a lower surface of the upper protruding portion 613p may be separated from an optical member 100. An optical film 200 may be inserted into a space between the lower surface of the upper protruding portion 613p and the optical member 100. An upper surface of the optical film 200 may be disposed on and attached to the lower surface of the upper protruding portion 613p. Side surfaces of the optical film 200 may contact the sidewall portion 613w. However, even if the side surfaces of the optical film 200 are separated from the sidewall portion 613w, the optical film 200 can be fixed by being coupled to the upper protruding portion 613p. The optical film 200 may be separated from the display panel 300 by a thickness of the upper protruding portion 613p, except for a portion where the upper protruding portion 613p is formed. Accordingly, the optical film 200 may be stably fixed by being attached to the lower surface of the upper protruding portion 613p of the inter-module coupling member 613.

Figure 33:
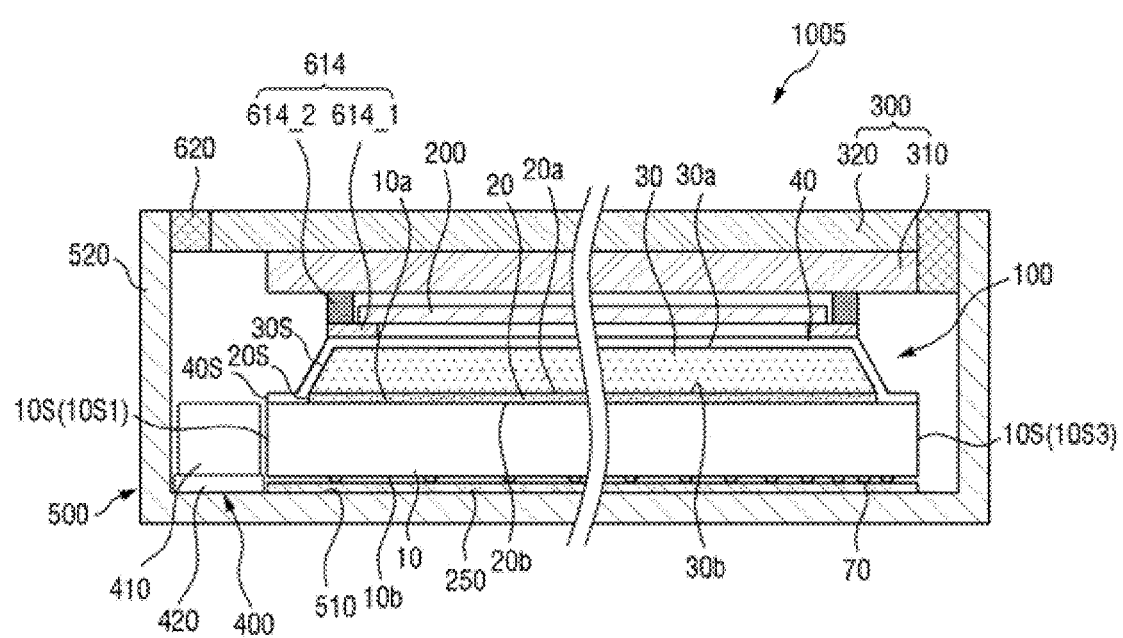
FIG. 33 is a cross-sectional of a display device according to some exemplary embodiments.

FIG. 33 is a cross-sectional view of a display device 1005 according to some exemplary embodiments. Referring to FIG. 33, the display device 1005 is different from the display device 1000 of FIG. 27 in that an inter-module coupling member 614 includes a first inter-module coupling member 614_1 and a second inter-module coupling member 614_2. However, the overall shape of the inter-module coupling member 614 may be substantially the same as that of the inter-module coupling member 612 of FIG. 31.

For example, the first inter-module coupling member 614_1 is disposed at edge portions of a passivation layer 40 of an optical member 100, and the second inter-module coupling member 614_2 is disposed on the first inter-module coupling member 614_1. The first inter-module coupling member 614_1 and the second inter-module coupling member 614_2 may contact and be coupled to each other. An upper surface of the second inter-module coupling member 614_2 is attached to a display panel 300. The first inter-module coupling member 614_1 protrudes further inward than the second inter-module coupling member 614_2. A lower surface of an optical film 200 may be disposed on and attached to an upper surface of the first inter-module coupling member 614_1. Accordingly, the optical film 200 may be stably fixed by being attached to the upper surface of the first inter-module coupling member 614_1 of the inter-module coupling member 614.

Unlike in FIG. 33, the overall shape of the inter-module coupling member 614 can be substantially the same as that of the inter-module coupling member 613 of FIG. 32. Such a modification is understood with reference to FIGS. 32 and 33, and, thus, a description of the modification will be omitted.

According to various exemplary embodiments, an optical member is provided as an integrated single member capable of simultaneously performing a light guide function and a wavelength conversion function, and preventing deterioration of a wavelength conversion layer through a sealing structure. The integrated single member is relatively thin and can simplify the process of assembling a display device.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. An optical member comprising:
a light guide plate;
a low refractive layer disposed on the light guide plate, a refractive index of the low refractive layer being smaller than a refractive index of the light guide plate;
a barrier layer disposed on the low refractive layer;
a wavelength conversion layer disposed on the barrier layer; and
a passivation layer disposed on the wavelength conversion layer, the passivation layer overlapping an upper surface of the wavelength conversion layer,
wherein a thickness of the low refractive index layer is greater than or equal to 0.4 µm.

2. The optical member of claim 1, wherein the barrier layer comprises an inorganic material.

3. The optical member of claim 2, wherein the light guide plate comprises an organic material.

4. The optical member of claim 1, wherein the passivation layer comprises an inorganic material.

5. The optical member of claim 1, wherein the side surface of the wavelength conversion layer is aligned with a side surface of the barrier layer or located further inwards than the side surface of the barrier layer.

6. The optical member of claim 1, wherein the refractive index of the low refractive layer is 1.2 to 1.4.

7. The optical member of claim 6, wherein the low refractive layer comprises voids.

8. A display device comprising:
an optical member comprising:
a light guide plate;
a low refractive layer disposed on the light guide plate, a refractive index of the low refractive layer being smaller than a refractive index of the light guide plate;
a wavelength conversion layer disposed on the low refractive layer; and
a passivation layer disposed on the wavelength conversion layer, the passivation layer overlapping an upper surface of the wavelength conversion layer and an upper surface of the low refractive layer;
a light source disposed on at least one side of the light guide plate; and
a display panel disposed on the optical member,
wherein a thickness of the low refractive index layer is greater than or equal to 0.4 µm.

9. The display device of claim 8, wherein the light guide plate and the passivation layer comprise an inorganic material.

10. The display device of claim 8, further comprising:
an inter-module coupling member disposed at edge portions of the optical member, the inter-module coupling member coupling the optical member and the display panel to each other.

11. The display device of claim 10, further comprising:
one or more optical films disposed in a space surrounded by the optical member, the display panel, and the inter-module coupling member.

12. The display device of claim 11, wherein:
the inter-module coupling member comprises:
a sidewall portion; and
a protruding portion protruding inward from the sidewall portion; and
the optical films are disposed on the protruding portion.

13. The display device of claim 11, wherein:
the inter-module coupling member comprises:
a first inter-module coupling member disposed on the passivation layer; and
a second inter-module coupling member disposed between the first inter-module coupling member and the display panel;
the first inter-module coupling member protrudes further inward than the second inter-module coupling member; and
the optical films are disposed on a portion of the first inter-module coupling member that protrudes further than the second inter-module coupling member.

14. The display device of claim 8, further comprising:
a housing accommodating the optical member, the light source, and the display panel.

15. The display device of claim 14, further comprising:
a housing coupling member coupling side surfaces of the display panel to sidewalls of the housing.

16. The display device of claim 8, wherein the refractive index of the low refractive layer is 1.2 to 1.4.

17. The display device of claim 16, wherein the low refractive layer comprises voids.

18. A display device comprising:
an optical member comprising:
a light guide plate;
a low refractive layer disposed on the light guide plate, a refractive index of the low refractive layer being smaller than a refractive index of the light guide plate;
a barrier layer disposed on the low refractive layer;
a wavelength conversion layer disposed on the barrier layer; and
a passivation layer disposed on the wavelength conversion layer, the passivation layer overlapping an upper surface of the wavelength conversion layer;
a light source disposed on at least one side of the light guide plate; and
a display panel disposed on the optical member,
wherein a thickness of the low refractive index layer is greater than or equal to 0.4 µm.

19. The display device of claim 18, wherein the barrier layer and the passivation layer comprise an inorganic material.

20. The display device of claim 19, wherein the light guide plate comprises an organic material.

21. The display device of claim 18, wherein the refractive index of the low refractive layer is 1.2 to 1.4.

22. The display device of claim 21, wherein the low refractive layer comprises voids.

* * * * *